United States Patent
Wei et al.

(10) Patent No.: US 9,826,528 B2
(45) Date of Patent: Nov. 21, 2017

(54) HYBRID RECONFIGURATION METHODS AND APPARATUS FOR TDD ADAPTATION

(71) Applicant: QUALCOMM Incorporated, San Diego, CA (US)

(72) Inventors: Chao Wei, Beijing (CN); Neng Wang, Beijing (CN); Minghai Feng, Beijing (CN); Jilei Hou, Beijing (CN)

(*) Notice: Subject to any disclaimer, the term of this patent is extended or adjusted under 35 U.S.C. 154(b) by 118 days.

(21) Appl. No.: 14/653,114

(22) PCT Filed: Jan. 16, 2014

(86) PCT No.: PCT/CN2014/000053
§ 371 (c)(1),
(2) Date: Jun. 17, 2015

(87) PCT Pub. No.: WO2014/110981
PCT Pub. Date: Jul. 24, 2014

(65) Prior Publication Data
US 2015/0341927 A1   Nov. 26, 2015

(30) Foreign Application Priority Data

Jan. 17, 2013   (WO) ................ PCT/CN2013/000050

(51) Int. Cl.
*H04J 3/00* (2006.01)
*H04W 72/04* (2009.01)
(Continued)

(52) U.S. Cl.
CPC ....... *H04W 72/0446* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

| 2010/0118807 A1* | 5/2010 | Seo ..................... H04W 72/042 370/329 |
| 2011/0116428 A1* | 5/2011 | Seong .................. H04L 1/0038 370/311 |

(Continued)

FOREIGN PATENT DOCUMENTS

| CN | 102064879 A | 5/2011 |
| CN | 102076031 A | 5/2011 |

(Continued)

OTHER PUBLICATIONS

EPO, Supplemental Partial European Search Report, EP App. No. 14740312.5, Jul. 20, 2016, European Patent Office, The Hague, 7 pgs.

(Continued)

*Primary Examiner* — Nicholas Sloms
(74) *Attorney, Agent, or Firm* — Holland & Hart LLP

(57) ABSTRACT

Methods, systems, and devices are described for reconfiguring a user equipment (UE) to operate in a reconfigured TDD UL-DL configuration. An initial uplink-downlink (UL-DL) configuration for TDD communication may be provided for communication between an e Node B and a UE. One or more subframes within each frame transmitted using the initial UL-DL configuration may be identified as flexible subframes. The identification of flexible subframes may permit the identification of timing for HARQ transmissions that does not change when a reconfiguration takes place. A different UL-DL configuration may be transmitted to the UE, in which at least one flexible subframe is to be changed from an uplink subframe to a downlink subframe. The different UL-DL configuration may be transmitted by, for example, a pseudo-uplink grant to the UE, which indicates that the UE is to reconfigure one or more flexible subframes from uplink to downlink transmission.

26 Claims, 16 Drawing Sheets

(51) Int. Cl.
  *H04L 5/14*   (2006.01)
  *H04W 72/14*  (2009.01)
  *H04L 1/18*   (2006.01)
  *H04W 76/04*  (2009.01)
  *H04W 88/02*  (2009.01)
  *H04L 5/00*   (2006.01)
  *H04L 1/16*   (2006.01)

(52) U.S. Cl.
  CPC .............. *H04L 5/0092* (2013.01); *H04L 5/14* (2013.01); *H04L 5/1469* (2013.01); *H04W 72/14* (2013.01); *H04W 76/046* (2013.01); *H04L 1/1614* (2013.01); *H04L 5/001* (2013.01); *H04L 5/0023* (2013.01); *H04L 5/0035* (2013.01); *H04L 5/0055* (2013.01); *H04W 88/02* (2013.01)

(56) References Cited

U.S. PATENT DOCUMENTS

2012/0230232 A1* 9/2012 Ji .................. H04B 7/2656
                                                  370/280
2014/0133388 A1* 5/2014 Wager ............... H04B 7/14
                                                  370/315

FOREIGN PATENT DOCUMENTS

| CN | 102349347 A | 2/2012 |
|---|---|---|
| CN | 102624490 A | 8/2012 |
| CN | 102740477 A | 10/2012 |
| EP | 2498419 A2 | 9/2012 |
| WO | WO-2012149673 A1 | 11/2012 |

OTHER PUBLICATIONS

Huawei et al., "Methods to Support Different Time Scales for TDD UL-DL Reconfiguration," 3GPP TSG RAN WG1 Meeting #69, R1-122909, Prague, Czech Republic, May 21-25, 2012, 4 pgs., 3rd Generation Partnership Project.

Renesas Mobile Europe Ltd., "Discussion on Enhancements for Dynamic TDD UL-DL Configuration," 3GPP TSG-RAN WG1 Meeting #69, R1-122363, Prague, Czech Republic, May 21-25, 2012, 4 pgs., 3rd Generation Partnership Project.

ISA/CN, International Search Report and Written Opinion of the International Searching Authority, Int'l App. No. PCT/CN2013/000050, Jan. 17, 2013, the State Intellectual Property Office, the People's Republic of China, Beijing, CN, 10 pgs.

ISA/CN, International Search Report and Written Opinion of the International Searching Authority, Int'l App. No. PCT/CN2014/000053, Jan. 16, 2014, the State Intellectual Property Office, the People's Republic of China, Beijing, CN, 13 pgs.

Samsung, "Dynamic Reconfiguration of TDD UL-DL Configuration," 3GPP TSG RAN WG1 Meeting #69, R1-122267, Prague, Czech Republic May 21-25, 2012, 2 pgs., XP050600530, 3rd Generation Partnership Project.

EPO, Supplementary European Search Report, EP App. No. 14740312.5-1851, Nov. 11, 2016, European Patent Office, Munich, DE, 16 pgs.

* cited by examiner

Uplink-Downlink Configurations

| Uplink-Downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

200

HYBRID RECONFIGURATION METHODS AND APPARATUS FOR TDD ADAPTATION

CROSS REFERENCES

The present Application for Patent is a 371 national phase of International Patent Application No. PCT/CN2014/000053 to Qualcomm Incorporated et al., entitled "Hybrid Reconfiguration Methods and Apparatus for TDD Adaptation," filed Jan. 16, 2014; which claims priority to International Patent Application No. PCT/CN2013/000050 to Qualcomm Incorporated et al., entitled "Hybrid Reconfiguration Methods and Apparatus for TDD Adaptation," filed Jan. 17, 2013; each of which is assigned to the assignee hereof, and expressly incorporated by reference herein.

BACKGROUND

The following relates generally to wireless communication, and more specifically to establishing wireless communications with eNodeBs having preferred signal transmission configurations. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Additionally, some systems may operate using time-division duplex (TDD), in which a single carrier frequency is used for both uplink and downlink communications, and some systems may operate using frequency-division duplex (FDD), in which separate carrier frequencies are used for uplink and downlink communications.

In systems that operate using TDD, different formats may be used in which uplink and downlink communications may be asymmetric. TDD formats include transmission of frames of data, each including a number of different subframes in which different subframes may be uplink or downlink subframes. Reconfiguration of TDD formats may be implemented based on data traffic patterns of the particular system, in order to provide additional uplink or downlink data capacity to users of the system.

SUMMARY

The described features generally relate to one or more improved systems, methods, and/or apparatuses for reconfiguring a user equipment (UE) to operate in a reconfigured TDD UL-DL configuration. An initial uplink-downlink (UL-DL) configuration for TDD communication may be provided for communication between an eNodeB and a UE. One or more subframes within each frame transmitted using the initial UL-DL configuration may be identified as flexible subframes. The identification of flexible subframes may permit the identification of timing for HARQ transmissions that does not change when a reconfiguration takes place. A different UL-DL configuration may be transmitted to the UE, in which at least one flexible subframe is to be changed from an uplink subframe to a downlink subframe. The different UL-DL configuration may be transmitted by, for example, a pseudo-uplink grant to the UE or RRC signaling to the UE, which may indicate that the UE is to reconfigure one or more subframes for uplink or downlink transmission.

In one aspect, a method of wireless communication performed by an eNodeB in time-division duplex (TDD) communication with a user equipment (UE) is provided. The method generally includes determining an initial uplink-downlink (UL-DL) configuration for TDD communication with the UE, identifying one or more subframes within each frame transmitted using the initial UL-DL configuration as flexible subframes, determining a different UL-DL configuration is to be used for TDD communication with the UE, the different UL-DL configuration comprising at least one flexible subframe that is to be changed from an uplink subframe to a downlink subframe, and transmitting a reconfiguration message to the UE, indicating that the at least one flexible subframe is to be changed from an uplink subframe to a downlink subframe. The reconfiguration message may include, for example, physical layer signaling to the UE, and/or a pseudo-uplink grant for the at least one flexible subframe that is to be changed from an uplink subframe to a downlink subframe in a subsequent frame. In some examples, hybrid automatic retransmission request (HARQ) acknowledgment timing is unchanged between the initial UL-DL configuration and the different UL-DL configuration. In some examples, the initial UL-DL configuration may include a maximum number of uplink subframes within each frame.

In some examples, the method may also include determining an uplink hybrid automatic retransmission request (HARQ) acknowledgment position within the subframes based on the UL-DL configuration of the maximum number of uplink subframes. The maximum number of uplink subframes may be transmitted, for example, in a system information block (SIB). The initial UL-DL configuration may also include a minimum number of uplink subframes within each frame. In some examples, the method may also include determining a downlink HARQ acknowledgment position within the subframes based on UL-DL configuration of the minimum number of uplink subframes. The minimum number of uplink subframes may be transmitted, for example, using a first bitmap identifying the minimum number of uplink subframes or a configuration index that identifies minimum uplink subframes in a semi-static set of different minimum uplink subframes. The maximum number of uplink subframes may be transmitted using a second bitmap identifying the maximum number of uplink subframes or using a second configuration index that identifies the maximum number of subframes. In some examples, at least one flexible subframe is determined based on the first and second bitmaps or first and second configuration indices. In some examples, the minimum number of uplink subframes are transmitted using radio resource control (RRC) signaling with the UE.

In some examples, the method may further include transmitting the initial UL-DL configuration to the UE. The initial UL-DL configuration may be transmitted, for example, in one system information block (SIB). The reconfiguration message may include, for example, one or more of a radio resource control (RRC) message that identifies the flexible subframes that are to be reconfigured. In some examples, the flexible subframes are initially configured as uplink subframes.

In another aspect, a method of wireless communication performed by an eNodeB in time-division duplex (TDD) communication with a user equipment (UE) is provided. The method generally includes transmitting an initial uplink-downlink (UL-DL) configuration for TDD communication to the UE, and transmitting a pseudo-uplink grant to the UE to reconfigure the UL-DL configuration to a different UL-DL configuration. The pseudo-uplink grant may include, for example, an invalid resource block allocation for at least one flexible subframe. Such an invalid resource block allocation may include a resource indication value (RIV) that exceeds a maximum value of an RIV for an uplink grant, for example. A RIV signals the resource allocation from the eNodeB to the UE. In some examples, a pseudo-uplink grant may include a first pseudo-uplink grant for a first of the flexible subframes, and wherein the method further comprises transmitting a second pseudo-uplink grant for a second of the flexible subframes.

In another aspect, a method of wireless communication performed by a user equipment (UE) in time-division duplex (TDD) communication with an eNodeB is provided. The method generally includes receiving an initial uplink-downlink (UL-DL) configuration for TDD communication with the eNodeB, identifying one or more subframes within each frame transmitted using the initial UL-DL configuration as flexible subframes, and receiving a reconfiguration message indicating that the at least one flexible subframe is to be changed from an uplink subframe to a downlink subframe in the subsequent frame. The receiving a reconfiguration message may include, for example, receiving physical layer signaling at the UE. The reconfiguration message may include, for example, a pseudo-uplink grant having an invalid resource block allocation for the at least one flexible subframe. Such an invalid resource block allocation may include, for example, a resource indication value (RIV) that exceeds a maximum value of an RIV for an uplink grant. Receiving the reconfiguration message may include, in some examples, receiving a second pseudo-uplink grant for a second of the flexible subframes.

In some examples, HARQ acknowledgment timing may be unchanged between the initial UL-DL configuration and the reconfigured UL-DL configuration. In some examples, the initial UL-DL configuration may include a maximum number of uplink subframes within each frame. Determining an uplink HARQ acknowledgment position within the subframes may be based on the UL-DL configuration of the maximum number of uplink subframes, in some examples. The maximum number of uplink subframes may be received, for example, in a system information block (SIB). The initial UL-DL configuration may also include a minimum number of uplink subframes within each frame. The method may further include, in some examples, determining a downlink HARQ acknowledgment position within the subframes based on the UL-DL configuration of the minimum number of uplink subframes. The minimum number of uplink subframes may be received, for example, using a bitmap identifying the minimum number of uplink subframes, or using a configuration index that identifies minimum uplink subframes in a semi-static set of different minimum uplink subframes.

In some examples, the method may further include receiving the initial UL-DL configuration from the eNodeB. The initial UL-DL configuration may be received, for example, in one system information block (SIB). The flexible subframes may initially be configured as uplink subframes, in some examples. The reconfiguration message may include one or more radio resource control (RRC) messages that identifies the flexible subframes that are to be reconfigured.

In another aspect, a method of wireless communication performed by a user equipment (UE) in time-division duplex (TDD) communication with an eNodeB is provided. The method generally includes receiving an initial uplink-downlink (UL-DL) configuration for TDD communication with the eNodeB, and receiving a pseudo-uplink grant to reconfigure the UL-DL configuration to a different UL-DL configuration. The pseudo-uplink grant may include, for example, an invalid resource block allocation for the at least one flexible subframe. The invalid resource block allocation may include, for example, a resource indication value (RIV) that exceeds a maximum value of an RIV for an uplink grant. In some examples, the pseudo-uplink grant may include a first pseudo-uplink grant for a first of the flexible subframes, and wherein the method may further include receiving a second pseudo-uplink grant for a second of the flexible subframes.

In another aspect, a wireless communication eNodeB apparatus in time-division duplex (TDD) communication with a user equipment (UE) is provided. The apparatus generally includes at least one processor and a memory coupled with the processor. The processor may be configured to determine an initial uplink-downlink (UL-DL) configuration for TDD communication with the UE, identify one or more subframes within each frame transmitted using the initial UL-DL configuration as flexible subframes, determine a different UL-DL configuration is to be used for TDD communication with the UE, the different UL-DL configuration comprising at least one flexible subframe that is to be changed from an uplink subframe to a downlink subframe, and transmit a reconfiguration message to the UE, indicating that the at least one flexible subframe is to be changed from an uplink subframe to a downlink subframe. The reconfiguration message may include physical layer signaling to the UE, and/or may include a pseudo-uplink grant for the at least one flexible subframe that is to be changed from an uplink subframe to a downlink subframe in the subsequent frame. The reconfiguration message may include one or more of radio resource control (RRC) message that identifies the flexible subframes that are to be reconfigured, for example.

In another aspect, a wireless communication eNodeB apparatus in time-division duplex (TDD) communication with a user equipment (UE) is provided. The apparatus generally includes at least one processor and a memory coupled with the at least one processor. The processor may be configured to transmit an initial uplink-downlink (UL-DL) configuration for TDD communication to the UE, and transmit a pseudo-uplink grant to the UE to reconfigure the UL-DL configuration to a different UL-DL configuration. The pseudo-uplink grant may include, for example an invalid resource block allocation for at least one flexible subframe, and the invalid resource block allocation may include a resource indication value (RIV) that exceeds a maximum value of an RIV for an uplink grant, in some examples.

In another aspect, a wireless communication user equipment (UE) apparatus configured to operate using one of multiple time-division duplex (TDD) uplink-downlink (UL-DL) configurations is provided. The apparatus generally includes at least one processor and a memory coupled with the processor. The processor may be configured to receive an initial uplink-downlink (UL-DL) configuration for TDD communication with the eNodeB, identify one or more subframes within each frame transmitted using the initial UL-DL configuration as flexible subframes, and receive a reconfiguration message indicating that the at least one flexible subframe is to be changed from an uplink subframe to a downlink subframe. The reconfiguration message may include physical layer signaling received at the UE and/or may include a pseudo-uplink grant having an invalid resource block allocation for the at least one flexible subframe, for example.

In another aspect, a wireless communication user equipment (UE) apparatus configured to operate using one of multiple time-division duplex (TDD) uplink-downlink (UL-DL) configurations is provided. The apparatus generally includes at least one processor and a memory coupled with the processor. The processor may be configured to receive an initial uplink-downlink (UL-DL) configuration for TDD communication with the eNodeB, and receive a pseudo-uplink grant to reconfigure the UL-DL configuration to a different UL-DL configuration. The pseudo-uplink grant may include an invalid resource block allocation for at least one flexible subframe, which may include a resource indication value (RIV) that exceeds a maximum value of an RIV for an uplink grant, for example. The pseudo-uplink grant may include a first pseudo-uplink grant for a first of the flexible subframes, and the processor may be further configured to receive a second pseudo-uplink grant for a second of the flexible subframes, in some examples.

In another aspect, a wireless communication eNodeB apparatus in time-division duplex (TDD) communication with a user equipment (UE). The apparatus generally includes means for determining an initial uplink-downlink (UL-DL) configuration for TDD communication with the UE, means for identifying one or more subframes within each frame transmitted using the initial UL-DL configuration as flexible subframes, means for determining a different UL-DL configuration is to be used for TDD communication with the UE, the different UL-DL configuration comprising at least one flexible subframe that is to be changed from an uplink subframe to a downlink subframe, and means for transmitting a reconfiguration message to the UE, indicating that the at least one flexible subframe is to be changed from an uplink subframe to a downlink subframe. The reconfiguration message may include, for example, physical layer signaling to the UE and/or a pseudo-uplink grant for the at least one flexible subframe that is to be changed from an uplink subframe to a downlink subframe in a subsequent frame. The initial UL-DL configuration may be transmitted in a system information block (SIB), for example. In some examples, the reconfiguration message may include one or more of radio resource control (RRC) message that identifies the flexible subframes that are to be reconfigured.

In another aspect, a wireless communication eNodeB apparatus in time-division duplex (TDD) communication with a user equipment (UE) is provided. The apparatus generally includes means for transmitting an initial uplink-downlink (UL-DL) configuration for TDD communication to the UE, and means for transmitting a pseudo-uplink grant to the UE to reconfigure the UL-DL configuration to a different UL-DL configuration. The pseudo-uplink grant may include an invalid resource block allocation for the at least one flexible subframe, for example.

In another aspect, wireless communication user equipment (UE) apparatus configured to operate using one of multiple time-division duplex (TDD) uplink-downlink (UL-DL) configurations is provided. The apparatus generally includes means for receiving an initial uplink-downlink (UL-DL) configuration for TDD communication with an eNodeB, means for identifying one or more subframes within each frame transmitted using the initial UL-DL configuration as flexible subframes, and means for receiving a reconfiguration message indicating that the at least one flexible subframe is to be changed from an uplink subframe to a downlink subframe. The reconfiguration message may include physical layer signaling received at the UE and/or a pseudo-uplink grant having an invalid resource block allocation for the at least one flexible subframe, for example.

In another aspect, a wireless communication user equipment (UE) apparatus configured to operate using one of multiple time-division duplex (TDD) uplink-downlink (UL-DL) configurations is provided. The apparatus generally includes means for receiving an initial uplink-downlink (UL-DL) configuration for TDD communication with the eNodeB, and means for receiving a pseudo-uplink grant to reconfigure the UL-DL configuration to a different UL-DL configuration. The pseudo-uplink grant may include, for example, an invalid resource block allocation for the at least one flexible subframe, which may include a resource indication value (RIV) that exceeds a maximum value of an RIV for an uplink grant.

In another aspect, a computer program product for wireless communications by an eNodeB configured for multiple concurrent time-division duplex (TDD) uplink-downlink (UL-DL) configurations is provided. The computer program product generally comprises a non-transitory computer-readable medium that includes code for determining an initial uplink-downlink (UL-DL) configuration for TDD communication with the UE, identifying one or more subframes within each frame transmitted using the initial UL-DL configuration as flexible subframes, determining a different UL-DL configuration is to be used for TDD communication with the UE, the different UL-DL configuration comprising at least one flexible subframe that is to be changed from an uplink subframe to a downlink subframe, and transmitting a reconfiguration message to the UE, indicating that the at least one flexible subframe is to be changed from an uplink subframe to a downlink subframe. The reconfiguration message may include physical layer signaling to the UE and/or a pseudo-uplink grant for the at least one flexible subframe that is to be changed from an uplink subframe to a downlink subframe in the subsequent frame, for example. In some examples, the reconfiguration message may include one or more of radio resource control (RRC) message that identifies the flexible subframes that are to be reconfigured.

In another aspect, a computer program product for wireless communications by an eNodeB configured for multiple concurrent time-division duplex (TDD) uplink-downlink (UL-DL) configurations is provided. The computer program product generally comprises a non-transitory computer-readable medium that includes code for transmitting an initial uplink-downlink (UL-DL) configuration for TDD communication to the UE, and transmitting a pseudo-uplink grant to the UE to reconfigure the UL-DL configuration to a different UL-DL configuration. The pseudo-uplink grant may include an invalid resource block allocation for at least one flexible subframe, for example.

In another aspect, a computer program product for wireless communications by a user equipment (UE) configured to operate using one of multiple time-division duplex (TDD) uplink-downlink (UL-DL) configurations is provided. The computer program product generally includes a non-transitory computer-readable medium that includes code for receiving an initial uplink-downlink (UL-DL) configuration for TDD communication with an eNodeB, identifying one or more subframes within each frame transmitted using the initial UL-DL configuration as flexible subframes, and receiving a reconfiguration message indicating that the at least one flexible subframe is to be changed from an uplink subframe to a downlink subframe. The reconfiguration message may include a pseudo-uplink grant having an invalid resource block allocation for the at least one flexible subframe, for example.

In another aspect, a computer program product for wireless communications by a user equipment (UE) configured to operate using one of multiple time-division duplex (TDD) uplink-downlink (UL-DL) configurations is provided. The computer program product generally includes a non-transitory computer-readable medium that includes code for receiving an initial uplink-downlink (UL-DL) configuration for TDD communication with the eNodeB, and receiving a pseudo-uplink grant to reconfigure the UL-DL configuration to a different UL-DL configuration. The pseudo-uplink grant may include an invalid resource block allocation for at least one flexible subframe, and the invalid resource block allocation comprises a resource indication value (RIV) that exceeds a maximum value of an RIV for an uplink grant, for example.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
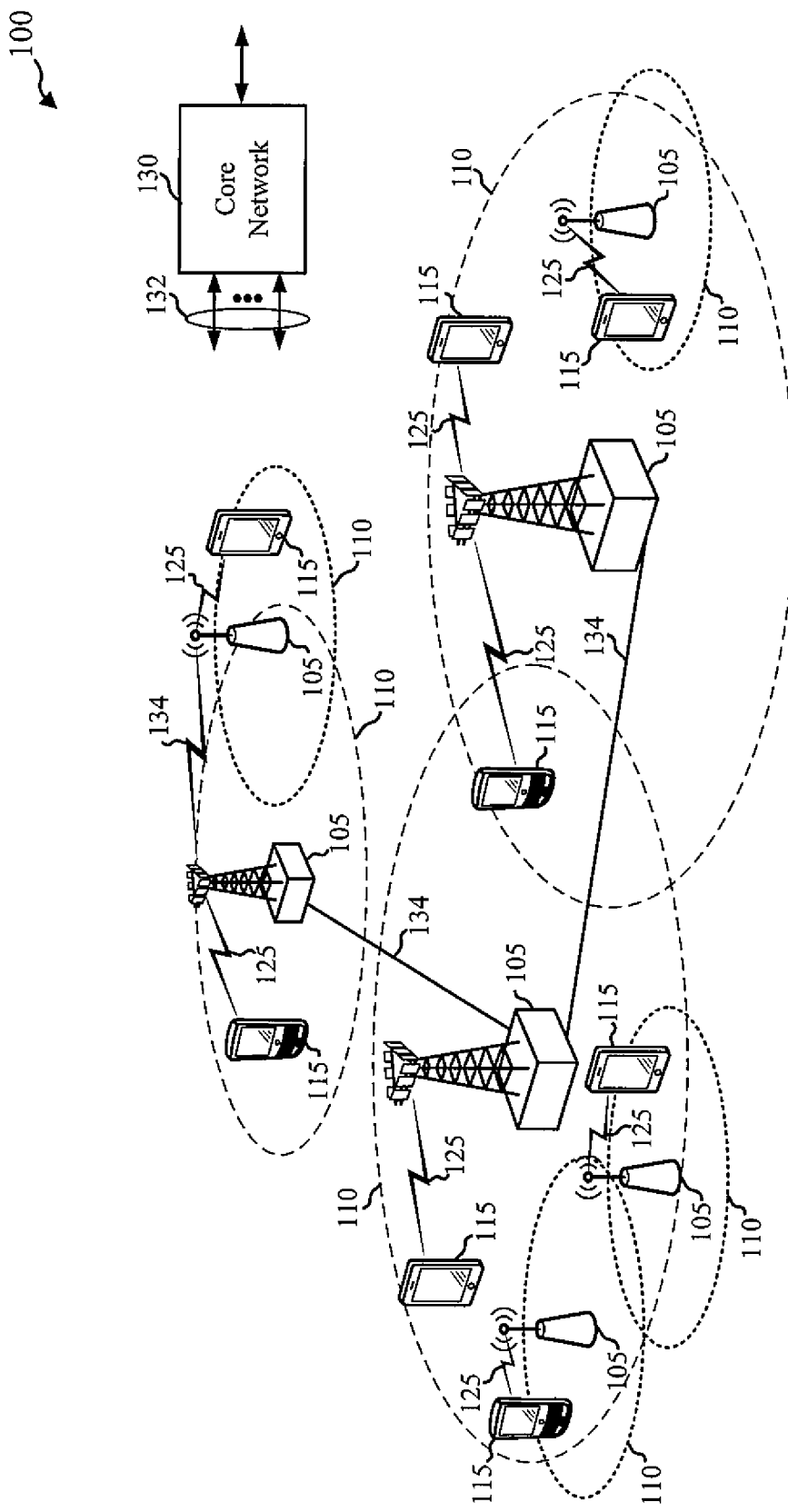
FIG. 1 is a diagram illustrating an example of a wireless communications system in accordance with various examples.

Various aspects of the disclosure provide for reconfiguring a user equipment (UE) to operate in a reconfigured TDD UL-DL configuration. An initial uplink-downlink (UL-DL) configuration for TDD communication may be provided for communication between an eNodeB and a UE. One or more subframes within each frame transmitted using the initial UL-DL configuration may be identified as flexible subframes. The identification of flexible subframes may permit the identification of timing for HARQ transmissions that does not change when a reconfiguration takes place. A different UL-DL configuration may be transmitted to the UE, in which at least one flexible subframe is to be changed from an uplink subframe to a downlink subframe. The different UL-DL configuration may be transmitted by, for example, a pseudo-uplink grant to the UE, which indicates that the UE is to reconfigure one or more subframes for uplink or downlink transmission.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The wireless communications system 100 includes eNodeBs (eNBs) 105 (also referred to as base stations or cells) 105, user equipments (UE) 115, and a core network 130. The eNodeBs 105 may communicate with the UEs 115 under the control of a base station controller (not shown), which may be part of the core network 130 or the eNodeBs 105 in various examples. The eNodeBs 105 may communicate control information and/or user data with the core network 130 through backhaul links 132. Backhaul links 132 may be wired backhaul links 132 (e.g., copper, fiber, etc.) and/or wireless backhaul links 132 (e.g., microwave, etc.). In examples, the eNodeBs 105 may communicate, either directly or indirectly, with each other over backhaul links 134, which may be wired or wireless communication links 134. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The eNodeBs 105 may wirelessly communicate with the UEs 115 via one or more eNodeB antennas. Each of the eNodeB 105 sites may provide communication coverage for a respective coverage area 110. In some examples, the eNodeBs 105 may be referred to as a base station, a base transceiver station, a radio base station, an access point, a radio transceiver, a basic service set (BSS), an extended service set (ESS), a NodeB, Home NodeB, a Home eNodeB, or some other suitable terminology. The coverage area 110 for a eNodeB 105 may be divided into sectors making up only a portion of the coverage area (not shown). The wireless communications system 100 may include eNodeBs 105 of different types (e.g., macro, micro, and/or pico base stations). There may be overlapping coverage areas for different technologies.

The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. In examples, some eNodeBs 105 may be synchronous while other eNodeBs may be asynchronous.

The UEs 115 are dispersed throughout the wireless communications system 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. A UE 115 may be able to communicate with macro base stations, pico base stations, femto base stations, relay base stations, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions. In examples, the communication links 125 are TDD carriers carrying bidirectional traffic within traffic frames.

In examples, the wireless communications system 100 is an LTE/LTE-A network. The wireless communications system 100 may be a Heterogeneous LTE/LTE-A network in which different types of eNodeBs 105 provide coverage for various geographical regions. For example, each eNodeB 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs 115 having an association with the femto cell (e.g., UEs in a closed subscriber group (CSG), UEs 115 for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. An eNodeB may support one or multiple (e.g., two, three, four, and the like) cells.

The wireless communications system 100 according to an LTE/LTE-A network architecture may be referred to as an Evolved Packet System (EPS). In such examples, the wireless communications system 100 may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The wireless communications system 100 may interconnect with other access networks using other Radio Access Technologies. For example, wireless communications system 100 may interconnect with a UTRAN-based network and/or a CDMA-based network via one or more Serving GPRS Support Nodes (SGSNs). To support mobility of UEs 115 and/or load balancing, the wireless communications system 100 may support handover of UEs 115 between a source eNodeB 105 and a target eNodeB 105. The wireless communications system 100 may support intra-RAT handover between eNodeBs or other base stations of the same RAT (e.g., other E-UTRAN networks), and inter-RAT handovers between eNodeBs or other base stations of different RATs (e.g., E-UTRAN to CDMA, etc.). The wireless communications system 100 may provide packet-switched services, however, as those skilled in the art will readily appreciate, the various concepts presented throughout this disclosure may be extended to networks providing circuit-switched services.

The E-UTRAN may include the eNodeBs 105 and may provide user plane and control plane protocol terminations toward the UEs 115. The eNodeBs 105 may be connected to other eNodeBs 105 via an X2 interface (e.g., backhaul link 134). The eNodeBs 105 may provide an access point to the core network 130 for the UEs 115. The eNodeBs 105 may be connected by an S1 interface (e.g., backhaul link 132) to the core network 130. Logical nodes within core network 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple eNodeBs 105 through, for example, Multiple Input Multiple Output (MIMO), Coordinated Multi-Point (CoMP), or other schemes. MIMO techniques use multiple antennas on the eNodeBs and/or multiple antennas on the UE to make use of multipath environments to transmit multiple data streams. CoMP includes techniques for dynamic coordination of transmission and reception by a number of eNodeBs 105 to improve overall transmission quality for UEs 115 as well as increasing network and spectrum utilization. Generally, CoMP techniques utilize backhaul links 132 and/or 134 for communication between eNodeBs 105 to coordinate control plane and user plane communications for the UEs 115.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

LTE/LTE-A utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The wireless communications system 100 may support operation on multiple carriers, which may be referred to as carrier aggregation (CA) or multi-carrier operation. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE may be configured with multiple downlink CCs and one or more uplink CCs for carrier aggregation. An eNodeB may transmit data and control information on one or more downlink CCs to the UE. The UE may transmit data and control information on one or more uplink CCs to the eNodeB.

The carriers may transmit bidirectional communications FDD (e.g., paired spectrum resources), TDD (e.g., unpaired spectrum resources). Frame structures for FDD (e.g., frame structure type 1) and TDD (e.g., frame structure type 2) may be defined. Each frame structure may have a radio frame length $T_f=307200 \cdot T_s=10$ ms and may include two half-frames of length $153600 \cdot T_s=5$ ms each. Each half-frame may include five subframes of length $30720 \cdot T_s=1$ ms.

Figure 2:
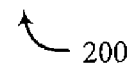
FIG. 2 is a table illustrating TDD Uplink-Downlink configurations in exemplary wireless communications system in accordance with various examples.

For TDD frame structures, each subframe may carry UL or DL traffic, and special subframes ("S") may be used to switch between DL to UL transmission. Allocation of UL and DL subframes within radio frames may be symmetric or asymmetric and may be reconfigured semi-statically (e.g., RRC messages via backhaul, etc.). Special subframes may carry some DL and/or UL traffic and may include a Guard Period (GP) between DL and UL traffic. Switching from UL to DL traffic may be achieved by setting timing advance at the UEs without the use of Special subframes or a guard period between UL and DL subframes. UL-DL configurations with switch-point periodicity equal to the frame period (e.g., 10 ms) or half of the frame period (e.g., 5 ms) may be supported. For example, TDD frames may include one or more Special frames, and the period between Special frames may determine the TDD DL-to-UL switch-point periodicity for the frame. For LTE/LTE-A, seven different UL-DL configurations are defined that provide between 40% and 90% DL subframes as illustrated in table FIG. 2 at Table 200. As indicated in table 200, there are two switching periodicities, 5 ms and 10 ms. For configurations with 5 ms switching periodicities, there are two special subframes per frame, and for configurations with 10 ms switching periodicities there is one special subframe per frame. Some of these configurations are symmetric, having the same number of uplink and downlink subframes, while some are asymmetric, having different numbers of uplink and downlink subframes. For example, UL-DL configuration 1 is symmetric, with four uplink and four downlink subframes, TDD UL-DL configuration 5 favors downlink throughput, and UL-DL configuration 0 favors uplink throughput.

The particular TDD UL/DL configuration that is used by an eNodeB may be based on user requirements for the particular coverage area. For example, with reference again to FIG. 1, if a relatively large number of users in a coverage area 110 are receiving more data than they are transmitting, the UL-DL configuration for the associated eNodeB 105 may be selected to favor downlink throughput. Similarly, if a relatively large number of users in a coverage are 110 are transmitting more data than they are receiving, the UL-DL configuration for the associated eNodeB 105 may be selected to favor uplink throughput and the eNodeB 105 may operate using UL-DL configuration 0. In some aspects, an eNodeB 105 may be able to dynamically reconfigure TDD UL-DL configurations on a frame-by-frame basis. In such cases, UEs 115 that are reconfigured may receive the reconfiguration message, and transmit/receive subframes on subsequent TDD frames using the reconfigured UL-DL configuration. Such capabilities allow for relatively fast switching for the reconfigured UEs 115 according to the instantaneous traffic situation, and may provide enhanced packet throughput between the UEs 115 and eNodeB 105. A UE 115, for example, may be in communication with an eNodeB 105 using an initial TDD UL-DL configuration. This initial TDD UL-DL configuration, however, may become unfavorable for efficient packet throughput at a later point in time. For example, the user may switch from receiving a relatively large amount of data to transmitting a relatively large amount of data. In such a situation, a ratio of uplink to downlink transmission data may have a significant change, which may result a previously favorable UL-DL configuration becoming an unfavorable UL-DL configuration.

Figure 3:
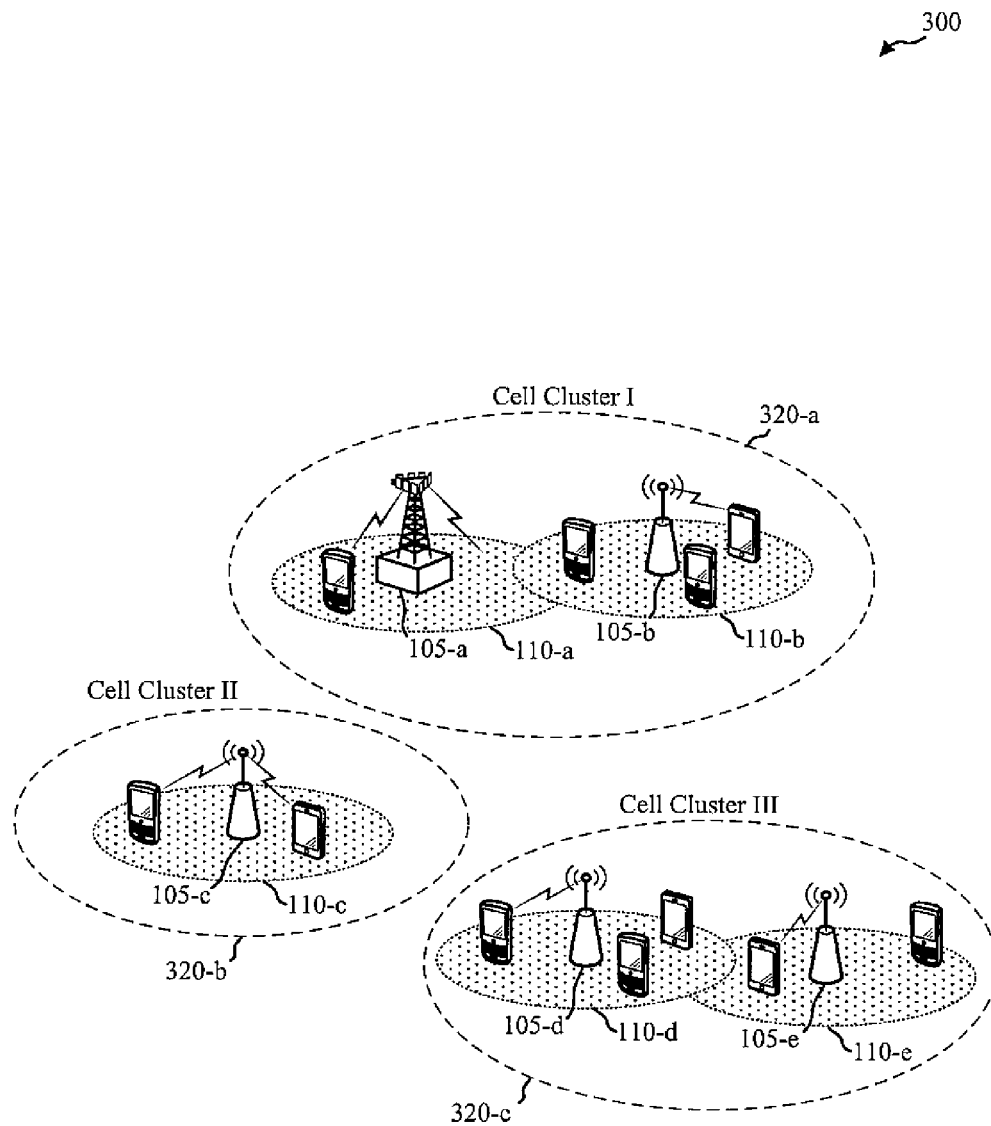
FIG. 3 illustrates a Cell Clustering Interference Mitigation environment with cells grouped according to cell clusters in accordance with various examples.

FIG. 3 illustrates a wireless communications system 300 in a Cell Clustering and Interference Mitigation (CCIM) environment with eNodeBs 105 (e.g., one or more of the eNodeBs 105 of FIG. 1) grouped according to cell clusters. The wireless communications system 300 may illustrate, for example, aspects of wireless communications system 100 illustrated in FIG. 1 or the table 200 illustrated in FIG. 2. Cell clusters can include one or more eNodeBs and eNodeBs within a cell cluster may be different types (e.g., macro eNodeB, pico eNodeB, femto eNodeB, and/or the like). As illustrated in the example of FIG. 3, the wireless communications system 300 includes cell clusters 320-a, 320-b, and 320-c. Cell cluster 320-a may include eNodeB 105-a and eNodeB 105-b, cell cluster 320-b may include eNodeB 105-c, and cell cluster 320-c may include eNodeBs 105-d and 105-e. Cell clusters 320 may be statically or semi-statically defined and each eNodeB 105 in a cell cluster 320 may be aware of the other eNodeBs 105 of its cluster. Cell clusters 320-a, 320-b, and/or 320-c may deploy TDD carriers and TDD UL-DL configuration within each cell cluster may be synchronized.

Traffic adaptation for synchronized TDD UL-DL configuration within a cell cluster may be performed by coordination of TDD UL-DL reconfiguration between cells of the cluster. Semi-static (e.g., on the order of tens of frames) TDD UL-DL reconfiguration may be performed by exchange of control-plane messaging among eNodeBs (e.g., via S1 and/or X2 interfaces, etc.). Semi-static TDD UL-DL reconfiguration may provide adequate performance under some conditions, e.g., when traffic conditions within the cluster change rapidly. In some aspects, rapidly changing traffic conditions may be accommodated through allowing the UL-DL configuration for a particular UE 115 to be reconfigured dynamically. Such dynamic reconfiguration may be transmitted to a UE 115 through signaling from the eNodeB 105, such as through control channel signaling, and apply to one or more subsequent TDD frames. Such reconfigurations may be accomplished according to "enhanced Interference Management and Traffic Adaptation" (eIMTA), which may be implemented in some networks.

In such networks, eIMTA compatible UEs may receive dynamic reconfiguration messages indicating that particular subframes within a TDD frame may be switched from an uplink to a downlink subframe. In some networks, the adaptation rate may be relatively fast, such as 10 ms, thus providing ability in some situations to change TDD UL-DL configurations on a frame-by-frame basis. UEs that are capable of operating according to eIMTA are referred to herein as non-legacy UEs, and UEs that are not capable of operating according to eIMTA are referred to herein as legacy UEs. In some situations, an eNodeB may be in communication with both legacy UEs and non-legacy UEs, and thus signaling between the UEs and eNodeB must be provided to allow the legacy UEs to operate properly while also allowing dynamic reconfiguration for non-legacy UEs as well as other related signaling, such as HARQ acknowledgements, to be carried out between the UEs and an eNodeB. To support legacy UEs, a downlink subframe in an established TDD UL-DL configuration, such as indicated in System Information Block 1 (SIB1), cannot be changed to an uplink subframe, as such a change may result in a Radio Resource Management (RRM) measurement and/or periodic Channel State Information (CSI) reporting problem. An eNodeB operating according to eIMTA may, however, modify scheduling information for legacy UEs and configure resources to certain uplink subframes in order to "blank" UL subframes that are reconfigured to be downlink subframes in non-legacy UEs. In some aspects, a signaling mechanism is provided to signal dynamic reconfiguration to one or more UEs.

Figure 4:
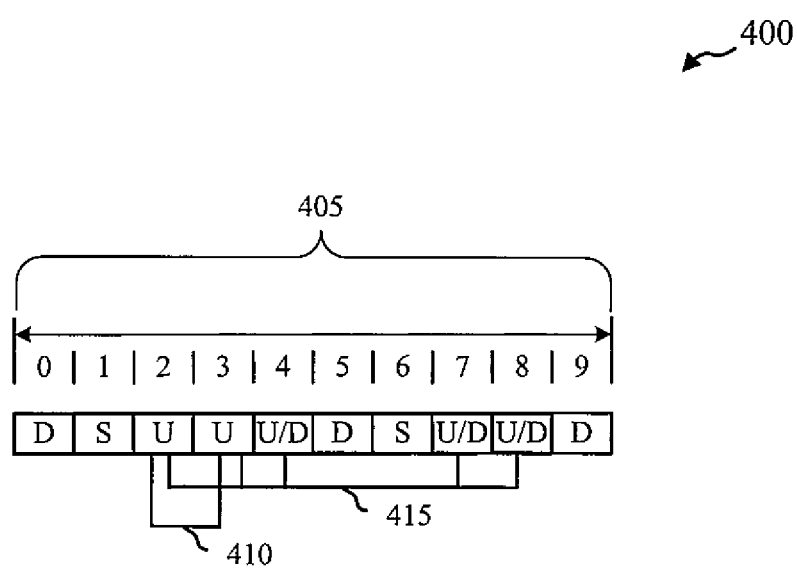
FIG. 4 shows a diagram of an exemplary TDD frames with associated minimum and maximum numbers of uplink subframes in accordance with various examples.

The timing for the transmission of HARQ information in a TDD system is determined according to the particular TDD UL-DL configuration. Various aspects provide that HARQ times may be determined based on properties of various subframes within a TDD frame. For example, FIG. 4 illustrates a frame 400 in a TDD system. The frame 400 includes 10 subframes 405, that are designated as an uplink subframe "U", a downlink subframe "D", a special subframe "S" or a flexible subframe "U/D." In the example of FIG. 4, subframes 4, 7, and 8 are indicated as being flexible subframes. In this example, a set of minimum uplink subframes 410 includes the subframes that are indicated as uplink subframes and cannot be reconfigured to be downlink subframes. A set of maximum uplink subframes 415 includes the subframes that are indicated as uplink subframes according to the initial UL-DL configuration. Thus, in any given frame that is transmitted according to the TDD UL-DL configuration of this example may have uplink data in subframes 2 and 3, and optionally in one or more of subframes 4, 7, or 8.

In some examples, subframes 4, 7, and 8 are initially set to be uplink subframes through, for example, a system information block (SIB) message. Legacy UEs that receive this message will simply operate according to the defined TDD UL-DL configuration. Non-legacy UEs, may, in some examples, receive signaling that indicates the set of minimum uplink subframes 410 and the set of maximum uplink subframes 415. In some examples, the minimum uplink subframes 410 identification and maximum uplink subframes 415 identification may be transmitted in bitmaps that are transmitted to the UE. In other examples, a set of semi-static TDD UL-DL minimum and/or maximum uplink subframe identifications may be established, and a configuration index may be received at the UE through, for example, RRC signaling that identifies the minimum uplink subframes 410 and/or maximum uplink subframes 415. For example, eight semi-static identifications of minimum uplink subframes may be established, which may be identified by a three-bit configuration index, with the three-bit configuration index received at the UE to identify the minimum uplink subframes. The UE may then identify the minimum and maximum uplink subframes, and also the flexible subframes. In some examples, the set of maximum uplink subframes 415 may be determined based on the TDD UL-DL configuration provided in the SIB message, and the minimum uplink subframes 410 may be determined based on a bitmap or configuration index transmitted to the UE in an RRC message. In other examples, the UE may receive an indication of a second TDD UL-DL configuration, which may be used to identify the minimum uplink subframes 410. In any case, UL subframes in the set of maximum uplink subframes 415, but not in the set of minimum uplink subframes 410, identified as flexible subframes, may be dynamically changed to downlink subframes for fast traffic adaptation. In some examples, the definition of the maximum and minimum uplink subframes can be based on hysteresis of uplink traffic load during an upcoming time.

As mentioned above, non-legacy UEs may be dynamically reconfigured to operate according to different TDD UL-DL configurations. When reconfiguring a UE, both HARQ timelines and reconfiguration signaling transmitted to the UE are provided in various examples. In some examples, uplink HARQ processes and acknowledgment/negative acknowledgment (ACK/NACK) position are determined based on the configuration with maximum uplink subframe set. Thus, regardless of reconfiguration of one or more of the flexible subframes, the UE will be able to provide uplink HARQ information in a consistent manner. Examples of uplink HARQ processes and ACK/NACK position will be described in more detail below. In some examples, downlink HARQ process and ACK/NACK positions are determined based on the TDD UL-DL configuration with the minimum uplink subframe set (i.e., the configuration having the maximum number of downlink subframes). Thus, regardless of reconfiguration of one or more of the flexible subframes, the UE will be able to provide downlink HARQ information in a consistent manner. In such a manner, such examples provide consistent HARQ timing for non-legacy UEs across different dynamic reconfigurations.

As also mentioned above, TDD UL-DL reconfiguration information is provided to non-legacy UEs to dynamically change uplink/downlink bandwidth between the eNodeB and the UE. In some examples, signaling is provided to the UE through L1 signaling from the eNodeB to the UE. In some examples, the UE receives an uplink grant for uplink subframe, with a pseudo-uplink grant provided for any flexible subframes that are to be downlink subframes during a given frame. Such a pseudo-uplink grant thus informs the UE of a change in the transmission direction for the particular subframe. Only a UE that receives the pseudo-uplink grant will try to detect the downlink grant in the corresponding flexible subframe, thus saving power as compared to a UE having to receive and attempt to decode flexible subframes. Thus, an eNodeB may signal to enable or disable downlink transmission in flexible subframes on a per-UE basis.

In some examples, a pseudo-uplink grant may be denoted by an invalid resource block allocation in Downlink Control Information (DCI) format 0. According to the specifications for some communications systems, the number of bits for a resource indication value (RIV) exceeds the possibilities of RIVs. For example, in some versions of the E-UTRAN specifications, 13 bits are provided for the RIV, with a maximum number of RIVs being defined to be 5049. These specifications describe that a UE is to discard an uplink resource allocation in such a format if consistent control information is not detected. Thus, providing such a pseudo-uplink grant conforms with such specifications, and eIMTA capable UEs may use such an allocation as an indication to change the transmission direction on a flexible subframe associated with the resource. For example, with continued reference to FIG. 4, a RIV in a uplink grant associated with subframe 4 may be set to exceed the maximum RIV value. The non-legacy UE that receives this RIV may then recognize that the subframe 4 is to be used for reception of a downlink transmission. Examples of pseudo-uplink grants and reconfiguration of associated subframes will be described in more detail below.

Figure 5:
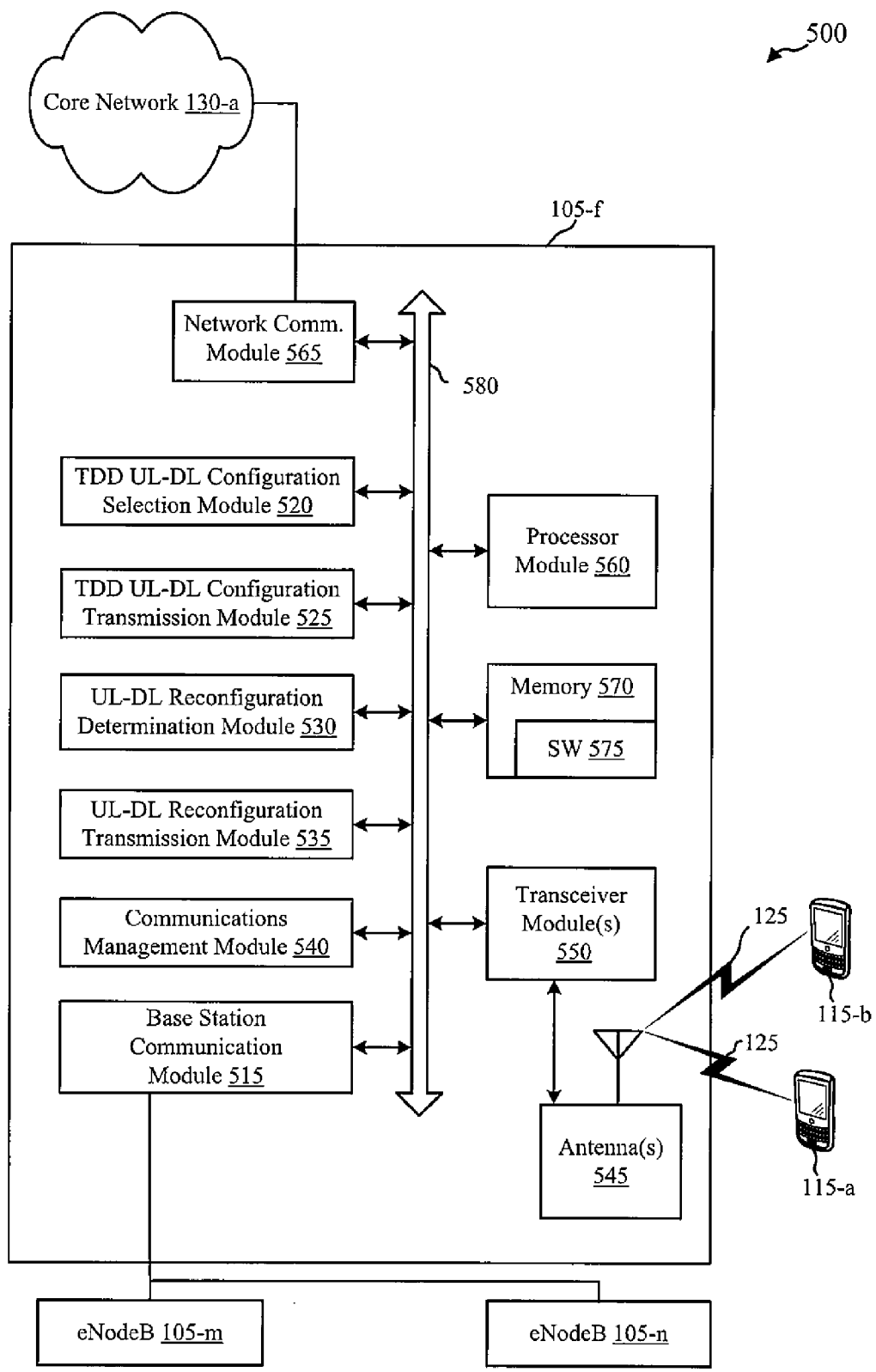
FIG. 5 shows a block diagram of an example of an eNodeB in accordance with various examples.

In order to provide reconfiguration signaling and consistent HARQ resource allocation in eIMTA systems, various aspects of the present disclosure provide for transmission of information related to the maximum and minimum number of uplink subframes that may be configured for TDD frames, as well as indications of particular subframes that are to be changed from uplink to downlink, or downlink to uplink. This allows non-legacy UEs that are compatible with eIMTA to transmit information without collision with legacy UEs operating with the same eNodeB. FIG. 5 shows a block diagram of a wireless communications system 500 that may be configured for reconfiguration of TDD UL-DL configuration. This wireless communications system 500 may be an example of aspects of the wireless communications system 100 depicted in FIG. 1, or the wireless communications system 300 of FIG. 3. The wireless communications system 500 may include an eNodeB 105-a. The eNodeB 105-f may include antenna(s) 545, a transceiver module 550, memory 570, and a processor module 560, which each may be in communication, directly or indirectly, with each other (e.g., over one or more buses 580). The transceiver module 550 may be configured to communicate bi-directionally, via the antenna(s) 545, with UE devices 115-a, 115-b. The transceiver module 550 (and/or other components of the eNodeB 105-f) may also be configured to communicate bi-directionally with one or more networks. In some cases, the eNodeB 105-f may communicate with the core network 130-a through network communications module 565. The eNodeB 105-f may be an example of an eNodeB base station, a Home eNodeB base station, a NodeB base station, and/or a Home NodeB base station.

The eNodeB 105-f may also communicate with other eNodeBs 105, such as eNodeB 105-m and eNodeB 105-n. In some cases, eNodeB 105-f may communicate with other eNodeBs such as 105-m and/or 105-n utilizing base station communication module 515. In some examples, base station communication module 515 may provide an X2 interface within an LTE wireless communication technology to provide communication between some of the eNodeBs 105. In some examples, eNodeB 105-*f* may communicate with other eNodeBs through core network 130-*a*.

The memory 570 may include random access memory (RAM) and read-only memory (ROM). The memory 570 may also store computer-readable, computer-executable software code 575 containing instructions that are configured to, when executed, cause the processor module 560 to perform various functions described herein (e.g., TDD UL-DL reconfiguration, HARQ operations, etc.). Alternatively, the computer-executable software code 575 may not be directly executable by the processor module 560 but be configured to cause the processor, e.g., when compiled and executed, to perform functions described herein.

The processor module 560 may include an intelligent hardware device, e.g., a central processing unit (CPU), a microcontroller, an application-specific integrated circuit (ASIC), etc. The transceiver module(s) 550 may include a modem configured to modulate the packets and provide the modulated packets to the antenna(s) 545 for transmission, and to demodulate packets received from the antenna(s) 545. While some examples of the eNodeB 105-*f* may include a single antenna 545, the eNodeB 105-*f* may include multiple antennas 545 for multiple links which may support carrier aggregation. For example, one or more links may be used to support macro communications with UE devices 115-*a*, 115-*b*.

According to the architecture of FIG. 5, the eNodeB 105-*f* may further include a communications management module 540. The communications management module 540 may manage communications with other eNodeBs 105. By way of example, the communications management module 540 may be a component of the eNodeB 105-*f* in communication with some or all of the other components of the eNodeB 105-*f* via a bus 580. Alternatively, functionality of the communications management module 540 may be implemented as a component of the transceiver module 550, as a computer program product, and/or as one or more controller elements of the processor module 560.

In some examples, the transceiver module 550 in conjunction with antenna(s) 545, along with other possible components of eNodeB 105-*f*, may determine TDD UL-DL configurations for various UEs communicating with the eNodeB 105-*f*, and also determine uplink resources for non-legacy UEs that may be reconfigured with different TDD UL-DL configurations. In some examples, eNodeB 105-*f* includes a TDD UL-DL configuration selection module 520 that determines a TDD UL-DL configuration for UEs 115-*a*, 115-*b*. As discussed above, in some aspects different UEs 115-*a*, 115-*b*, may include legacy UEs and non-legacy UEs, and TDD UL-DL configuration selection module 520 may determine UL-DL configurations for both legacy and non-legacy UEs. In the example of FIG. 5, UE 115-*a* may be a legacy UE, and UE 115-*b* may be a non-legacy UE. The TDD UL-DL configuration for legacy UE 115-*a* may be transmitted via SIB1 using TDD UL-DL configuration transmission module 525, in conjunction with transceiver module(s) 550. Likewise, an initial TDD UL-DL configuration for non-legacy UE 115-*b* may be transmitted using SIB1, using TDD UL-DL configuration transmission module 525 in conjunction with transceiver module(s) 550. TDD UL-DL configuration selection module 520 may also periodically determine that the default TDD UL-DL configuration for legacy UE 115-*a* is to be changed, in which case updated SIB1 blocks may be transmitted using TDD UL-DL configuration transmission module 525, in conjunction with transceiver module(s) 550. The TDD UL-DL configuration module also, in some examples, may generate one or more messages that indicate the minimum number of uplink subframes and the maximum number of uplink subframes that may be configured for non-legacy UE 115-*b*. Such messages may be transmitted to the UEs 115 using the TDD UL-DL configuration transmission module 525. In some examples, an identification of the minimum uplink subframes may be provided through a bitmap transmitted to the UE in an RRC message, and the identification of the maximum set of uplink of subframes may be determined based on the TDD UL-DL configuration provided in the SIB message. In some examples, an identification of the minimum uplink subframes may be determined based on a second semi-static TDD UL-DL configuration transmitted to the UE in an RRC message. In some examples, the definition of the maximum and minimum uplink subframes can be based on hysteresis of uplink traffic load during an upcoming time.

At some point, traffic patterns may change such than an initial TDD UL-DL configuration is not optimal for one or more UEs 115-*a* and 115-*b*. In the case of non-legacy UE 115-*b*, UL-DL reconfiguration determination module 530 may determine that the UL-DL configuration for non-legacy UE 115-*b* is to be reconfigured to a different UL-DL configuration. For example, changes in traffic between the eNodeB 105-*f* and non-legacy UE 115-*b* may change such that additional data is to be transmitted to non-legacy UE 115-*b*, in which case the UL-DL reconfiguration determination module 530 may determine that non-legacy UE 115-*b* is to be reconfigured to operate according to a different UL-DL configuration. Reconfiguration information may be provided to UL-DL reconfiguration transmission module 535, which may transmit TDD UL-DL reconfiguration messages, in conjunction with transceiver module(s) 550, to the UE 115-*b*. In some examples, the UL-DL reconfiguration determination module 530 may generate a pseudo-uplink grant that is to be transmitted to the UE 115-*b* to notify the UE 115-*b* that a particular subframe is to be changed from an uplink subframe to a downlink subframe. UL-DL reconfiguration transmission module 535 may transmit such a pseudo-uplink grant, in conjunction with transceiver module(s) 550, to the UE 115-*b*. As mentioned above, such a pseudo-uplink grant may be an invalid RIV that is transmitted to the UE, which indicates to the UE that a particular subframe is to be changed from an uplink subframe to a downlink subframe.

Figure 6:
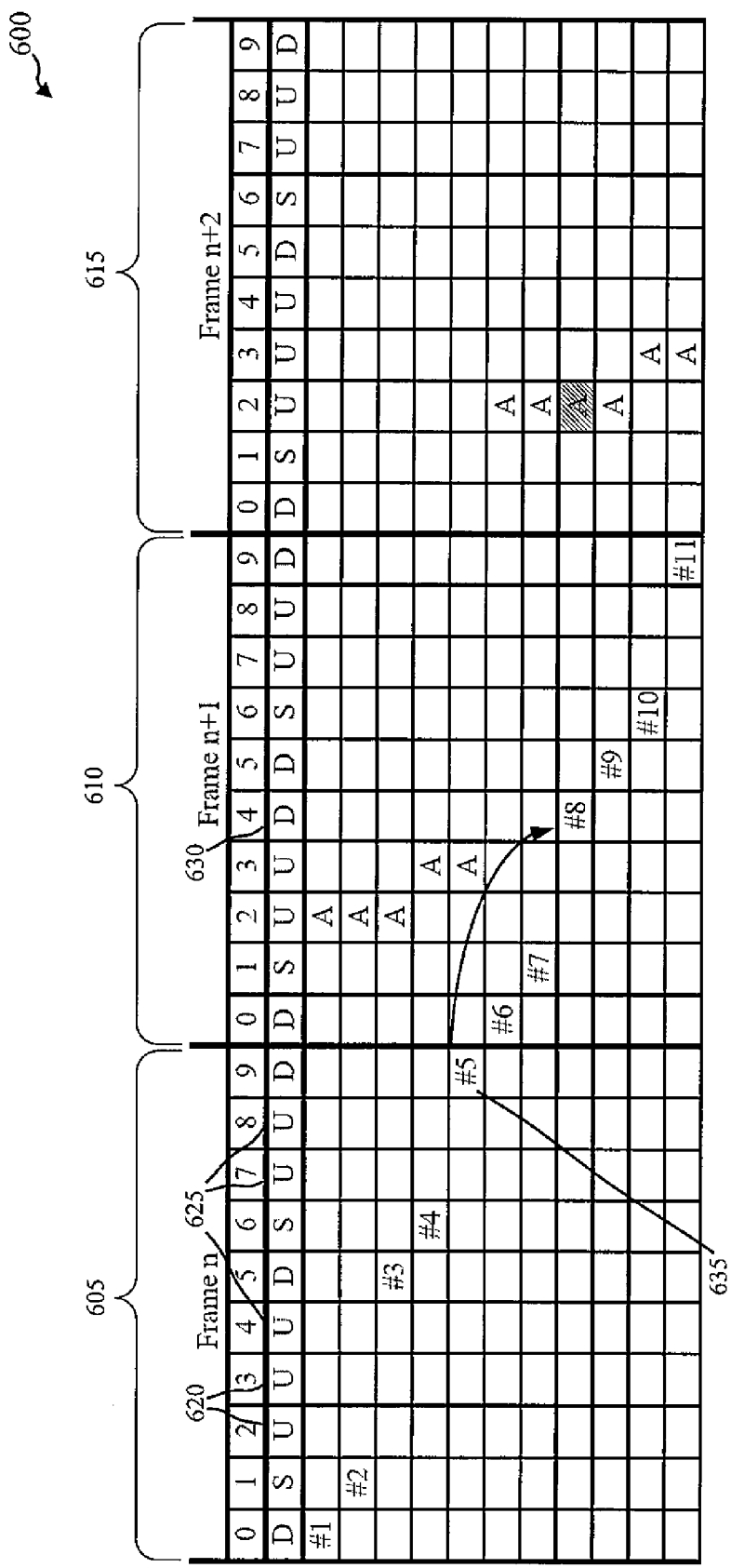
FIG. 6 shows an exemplary pseudo-uplink grant, associated downlink subframe, and HARQ acknowledgment resource, in accordance with various examples.

As mentioned above, a pseudo-uplink grant may be used in some examples to signal to a UE that a particular subframe is to be changed from an uplink subframe to a downlink subframe. FIG. 6 illustrates an example 600 of such a pseudo-uplink message transmission to reconfigure a non-legacy UE to operate according to a different TDD UL-DL configuration than an initially configured TDD UL-DL configuration. In this example, three frames are illustrated, namely frame n 605, frame n+1 610, and frame n+2 615. Initially, transmissions are conducted according to TDD UL-DL configuration 6. In this example, subframes 2 and 3 are identified as the minimum subframes in a subframe set 620. This identification may be accomplished, as mentioned above, through RRC signaling from an eNodeB to a UE. Because the initial configuration is TDD UL-DL configuration 6, the UE can identify flexible subframes 625 as the difference between the minimum identified uplink subframes and the uplink subframes associated with TDD UL-DL configuration 6. In some examples, it may be established that HARQ information in such a situation is to be transmitted from a UE to an eNodeB during subframes 2 and 3, namely the subframes identified in the minimum subframes in the subframe set 620. Following the first frame 605, HARQ ACK/NACK information for the downlink information in subframes identified as #1, #2, and #3 is transmitted in subframe 2 of the second frame 610. HARQ ACK/NACK information for the downlink information in subframes identified as #4 and #5 is transmitted in the third subframe of the second frame 610, according to this example. Furthermore, downlink information in subframe identified as #5 may include a pseudo-uplink grant 635 associated with the first flexible subframe 630 in the second frame 610. The UE will then know that the first flexible subframe 630 is to be reconfigured as a downlink subframe. The HARQ ACK/NACK information for the first flexible subframe 630, now configured as a downlink subframe, is then transmitted in subframe 2 of the third frame 615. Following the pseudo-uplink grant 635, no further pseudo-uplink grants are transmitted in this example, and thus the TDD UL-DL configuration for the third frame 615 returns to the initial TDD UL-DL configuration. In such a manner, the UE may be signaled to reconfigure uplink and downlink subframes, and also provide HARQ information in a consistent manner.

Figure 7:
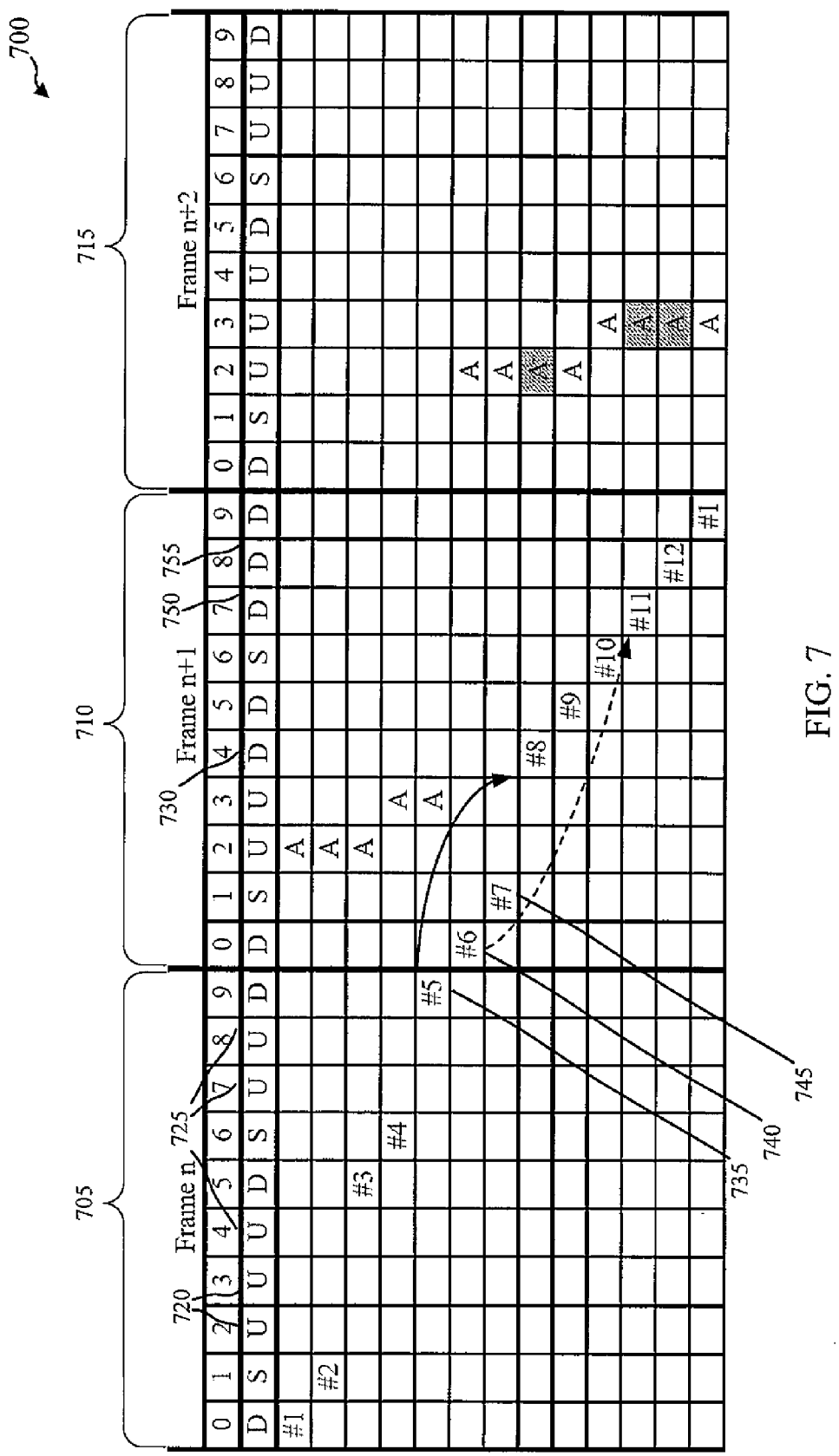
FIG. 7 shows another example of pseudo-uplink grants, associated downlink subframes, and associated HARQ acknowledgment resources in accordance with various examples.

FIG. 7 illustrates another example 700 of such a pseudo-uplink message transmission to reconfigure a non-legacy UE to operate according to a different TDD UL-DL configuration than an initially configured TDD UL-DL configuration. In this example, three frames are illustrated, namely frame n 705, frame n+1 710, and frame n+2 715. Initially, transmissions are conducted according to TDD UL-DL configuration 6. In this example, as in the example of FIG. 6, subframes 2 and 3 are identified as the minimum subframes in a subframe set 720. This identification may be accomplished, as mentioned above, through RRC signaling from an eNodeB to a UE. Because the initial configuration is TDD UL-DL configuration 6, the UE can identify flexible subframes 725 as the difference between the minimum identified uplink subframes and the uplink subframes associated with TDD UL-DL configuration 6. In some examples, it may be established that HARQ information in such a situation is to be transmitted from a UE to an eNodeB during subframes 2 and 3, namely the subframes identified in the minimum subframes in the subframe set 720. Following the first frame 705, HARQ ACK/NACK information for the downlink information in subframes identified as #1, #2, and #3 is transmitted in subframe 2 of the second frame 710. HARQ ACK/NACK information for the downlink information in subframes identified as #4 and #5 is transmitted in the third subframe of the second frame 710, according to this example. In this example, downlink information in subframe #5, #6, and #7 may include pseudo-uplink grants 735, 740, and 745 associated with each of the flexible subframes 730, 750, and 755 in the second frame 710. The UE will then know that flexible subframes 730, 750, and 755 are to be reconfigured as downlink subframes. The HARQ ACK/NACK information for these flexible subframes 730, 750, and 755, now configured as downlink subframes, is then transmitted in subframes 2 and 3 of the third frame 715. Following the pseudo-uplink grants 735, 740, and 745 no further pseudo-uplink grants are transmitted in this example, and thus the TDD UL-DL configuration for the third frame 715 returns to the initial TDD UL-DL configuration. In such a manner, the UE may be signaled to reconfigure uplink and downlink subframes, and also provide HARQ information in a consistent manner.

Figure 8:
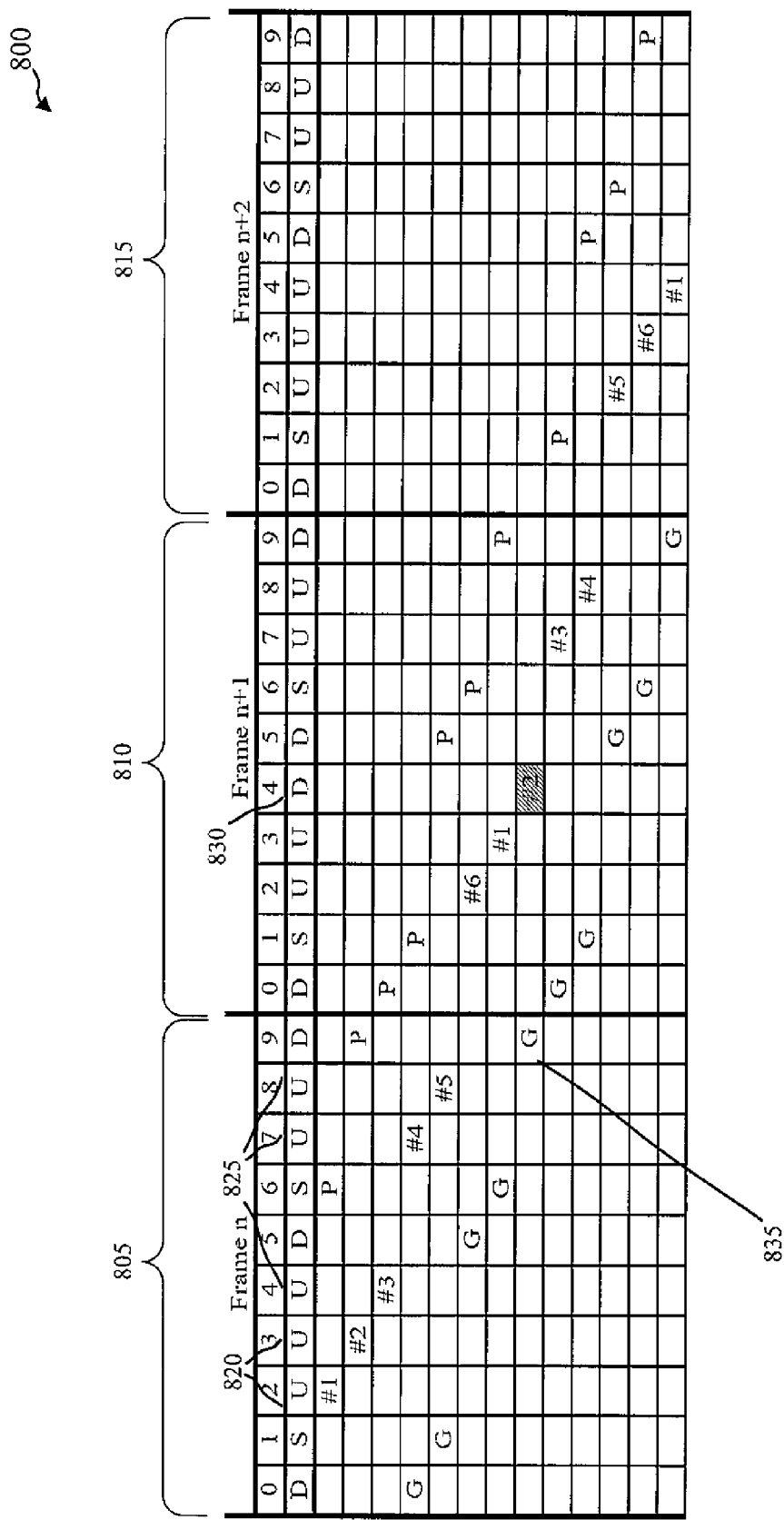
FIG. 8 shows an example of uplink grants, associated uplink subframes, pseudo-uplink grant and associated downlink subframe, and associated acknowledgment resources in accordance with various examples.

With reference now to FIG. 8, an example 800 of uplink HARQ timing for TDD reconfiguration is described. In this example, three frames are illustrated, namely frame n 805, frame n+1 810, and frame n+2 815. Initially, transmissions are conducted according to TDD UL-DL configuration 6. In this example, subframes 2 and 3 are identified as the minimum subframes in a subframe set 820. This identification may be accomplished, as mentioned above, through RRC signaling from an eNodeB to a UE. Because the initial configuration is TDD UL-DL configuration 6, the UE can identify flexible subframes 825 as the difference between the minimum identified uplink subframes and the uplink subframes associated with TDD UL-DL configuration 6. In some examples, it may be established that uplink HARQ information, namely HARQ information used to confirm that transmissions from the UE are properly received, is transmitted in downlink information provided in either downlink subframes or special subframes. In the example of FIG. 8, the G indicates an uplink grant indication provided to the UE, with pseudo-uplink grant information 835, which in this example contains an invalid uplink grant. This indicates to the UE that the subframe 830 associated with the invalid uplink grant is to be reconfigured to be a downlink subframe, rather than an uplink subframe. Uplink HARQ information, receipt of which is indicated with "P" in this example, is not received back at the UE for this subframe, due to the changed status of the subframe. Following the pseudo-uplink grant information 835, no further pseudo-uplink grants are transmitted in this example, and thus the TDD UL-DL configuration for the third frame 815 returns to the initial TDD UL-DL configuration. In such a manner, the UE may be signaled to reconfigure uplink and downlink subframes, and also provide/receive HARQ information in a consistent manner.

Figure 9:
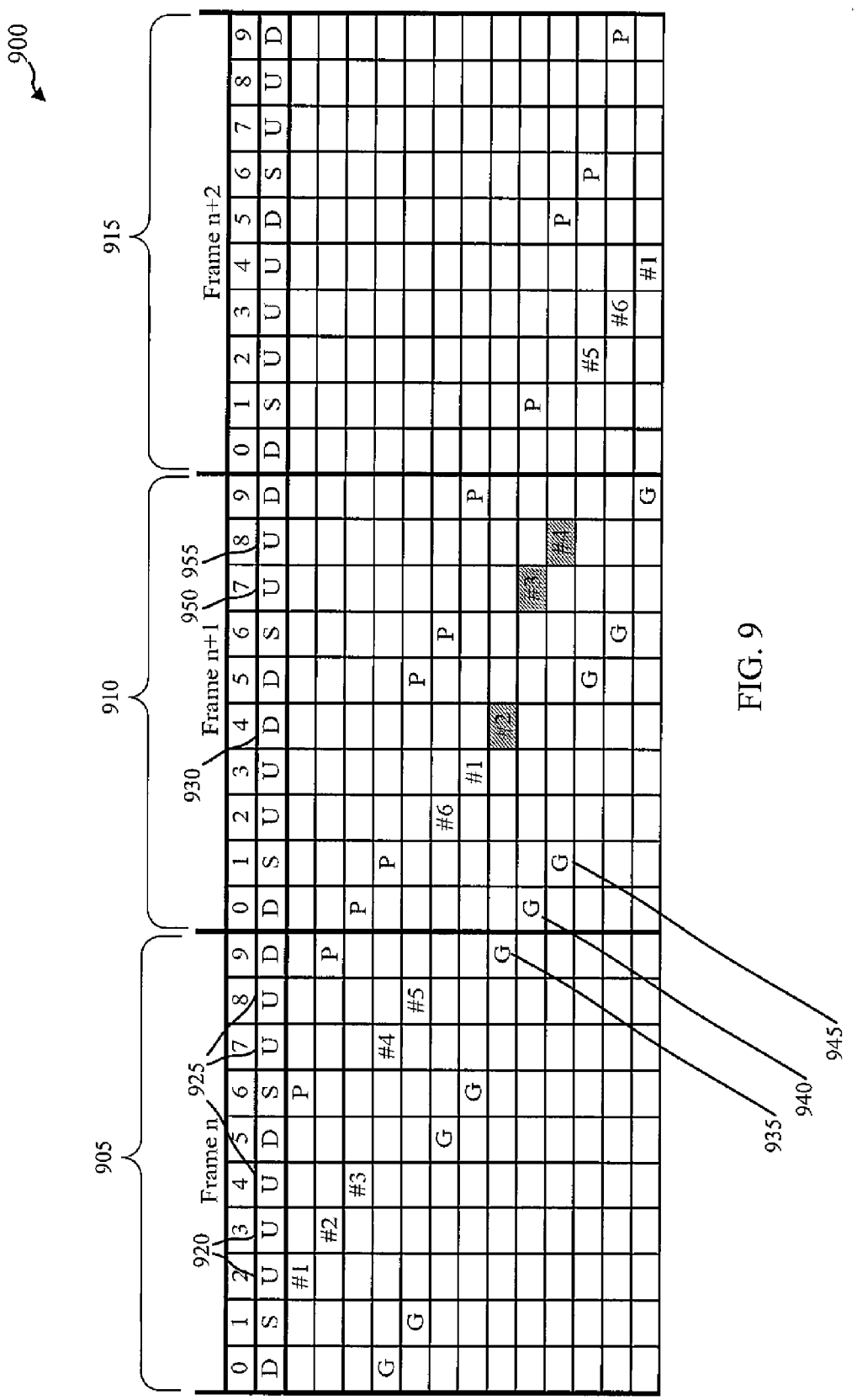
FIG. 9 shows another example of uplink grants, associated uplink subframes, pseudo-uplink grants and associated downlink subframes, and associated acknowledgment resources in accordance with various examples.

With reference now to FIG. 9, another example 900 of uplink HARQ timing for TDD reconfiguration is described. In this example, three frames are illustrated, namely frame n 905, frame n+1 910, and frame n+2 915. Initially, transmissions are conducted according to TDD UL-DL configuration 6. In this example, subframes 2 and 3 are identified as the minimum subframes in a subframe set 920. This identification may be accomplished, as mentioned above, through RRC signaling from an eNodeB to a UE. Because the initial configuration is TDD UL-DL configuration 6, the UE can identify flexible subframes 925 as the difference between the minimum identified uplink subframes and the uplink subframes associated with TDD UL-DL configuration 6. In some examples, it may be established that uplink HARQ information, namely HARQ information used to confirm that transmissions from the UE are properly received, is transmitted in downlink information provided in either downlink subframes or special subframes. In the example of FIG. 9, the G indicates an uplink grant indication provided to the UE, with pseudo-uplink grant information 935, 940, and 945, which in this example contains invalid uplink grants. This indicates to the UE that subframes 930, 950, and 955 associated with the invalid uplink grant are to be reconfigured to be downlink subframes, rather than uplink subframes. Uplink HARQ information, receipt of which is indicated with "P" in this example, is not received back at the UE for the reconfigured subframes, due to the changed status of the subframe. Following the pseudo-uplink grant information 935, 940, and 945 no further pseudo-uplink grants are transmitted in this example, and thus the TDD UL-DL configuration for the third frame 915 returns to the initial TDD UL-DL configuration. In such a manner, the UE may be signaled to reconfigure uplink and downlink subframes, and also provide/receive HARQ information in a consistent manner.

Figure 10:
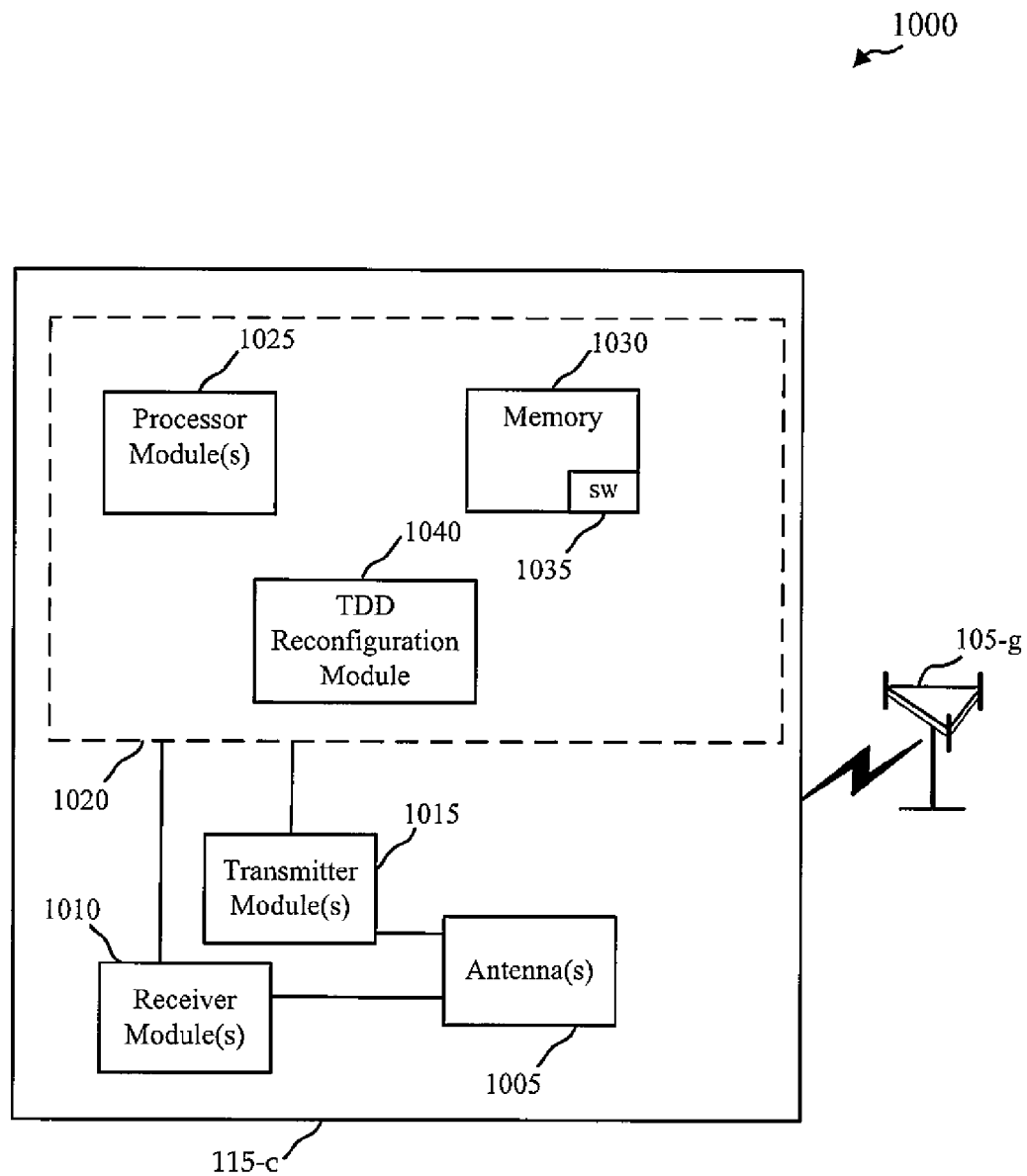
FIG. 10 shows a block diagram of an example of a user equipment in accordance with various examples.

According to some examples, an eNodeB may determine the TDD UL-DL configuration and reconfiguration associated with a UE, and also transmit information related to the minimum number of uplink subframes as well as reconfiguration messages that the UE is to use for communication with the eNodeB. The UE will receive this information, switch to the new TDD UL-DL configuration as indicated by reconfiguration messages, and transmit HARQ information using identified uplink resources based on the minimum number of uplink subframes. With reference now to FIG. 10, an example wireless communication system 1000 that performs TDD UL/DL reconfigurations is depicted. The wireless communication system 1000 includes a UE 115-c that may communicate with eNodeB 105-g to receive access to one or more wireless networks, and may be an example of aspects of the wireless communications system 100 of FIG. 1, the wireless communications system 300 of FIG. 3, or the wireless communications system 500 of FIG. 5. UE 115-c may be an example of a user equipment 115 of FIG. 1, 3, or 5. UE 115-c, includes one or more antenna(s) 1005 communicatively coupled to receiver module(s) 1010 and transmitter module(s) 1015, which are in turn communicatively coupled to a control module 1020. Control module 1020 includes one or more processor module(s) 1025, a memory 1030 that may include computer-executable software code 1035, and a TDD reconfiguration module 1040. The computer-executable software code 1035 may be for execution by processor module 1025 and/or TDD reconfiguration module 1040.

The processor module(s) 1025 may include an intelligent hardware device, e.g., a central processing unit (CPU), a microcontroller, an application specific integrated circuit (ASIC), etc. The memory 1030 may include random access memory (RAM) and read-only memory (ROM). The memory 1030 may store computer-readable, computer-executable software code 1035 containing instructions that are configured to, when executed (or when compiled and executed), cause the processor module 1025 and/or TDD reconfiguration module 1040 to perform various functions described herein (e.g., TDD UL-DL reconfiguration, and transmission of HARQ information on identified uplink resources). The TDD reconfiguration module 1040 may be implemented as a part of the processor module(s) 1025, or may be implemented using one or more separate CPUs or ASICs, for example. The transmitter module(s) 1015 may transmit to eNodeB 105-g (and/or other base stations) to establish communications with one or more wireless communications networks (e.g., E-UTRAN, UTRAN, etc.), as described above. The TDD reconfiguration module 1040 may be configured to receive TDD reconfiguration messages from eNodeB 105-g and change a TDD UL-DL configuration based on the received messages, such as based on the receipt of pseudo-uplink grants for particular subframes. The TDD reconfiguration module 1040 may also be configured to receive reconfiguration messages for the identification of reconfigured subframes, such as provided in examples as described above. The receiver module(s) 1010 may receive downlink transmissions from eNodeB 105-g (and/or other base stations), such as described above. Downlink transmissions are received and processed at the user equipment 115-c. The components of UE 115-c may, individually or collectively, be implemented with one or more Application Specific Integrated Circuits (ASICs) adapted to perform some or all of the applicable functions in hardware. Each of the noted modules may be a means for performing one or more functions related to operation of the UE 115-c.

Figure 11:
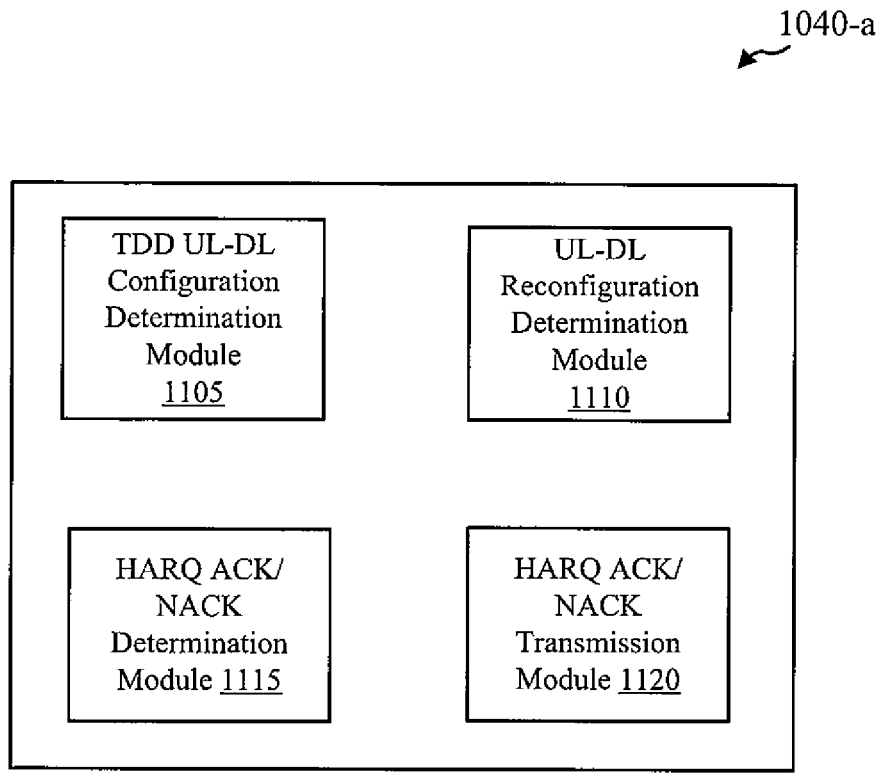
FIG. 11 shows a block diagram of an example of a TDD reconfiguration module in accordance with various examples.

FIG. 11 illustrates an example of a TDD reconfiguration module 1040-a, which includes a TDD UL-DL configuration determination module 1105, a UL-DL reconfiguration determination module 1110, a HARQ ACK/NACK determination module 1115, and a HARQ ACK/NACK transmission module 1120. The TDD UL-DL configuration determination module 1105 may receive TDD UL-DL configuration information from an eNodeB, and set the TDD UL-DL configuration according to the information. This information may be received through a system information block (e.g., SIB1), or may be received through one or more reconfiguration messages received from the eNodeB in accordance with eIMTA, for example. The TDD UL-DL configuration information may also include information related to a minimum set of subframes that are uplink subframes, which may be used to determine timing for providing HARQ ACK/NACK information. The UL-DL reconfiguration determination module 1110 may receive reconfiguration messages, such as uplink resource grants and pseudo-uplink resource grants, and determine that one or more subframes are to be reconfigured from uplink to downlink subframes, such as described above. HARQ ACK/NACK determination module 1115 may determine the appropriate ACK/NACK message to transmit based on the successful or unsuccessful receipt of downlink data in the associated downlink subframes. The HARQ ACK/NACK transmission module 1120 may receive the ACK/NACK information and the uplink resource information, and transmit the HARQ information on the identified uplink resource. The components of TDD reconfiguration module 1140-a may, individually or collectively, be implemented with one or more ASICs adapted to perform some or all of the applicable functions in hardware. Each of the noted modules may be a means for performing one or more functions related to operation of the TDD reconfiguration module 1140-a.

Figure 12:
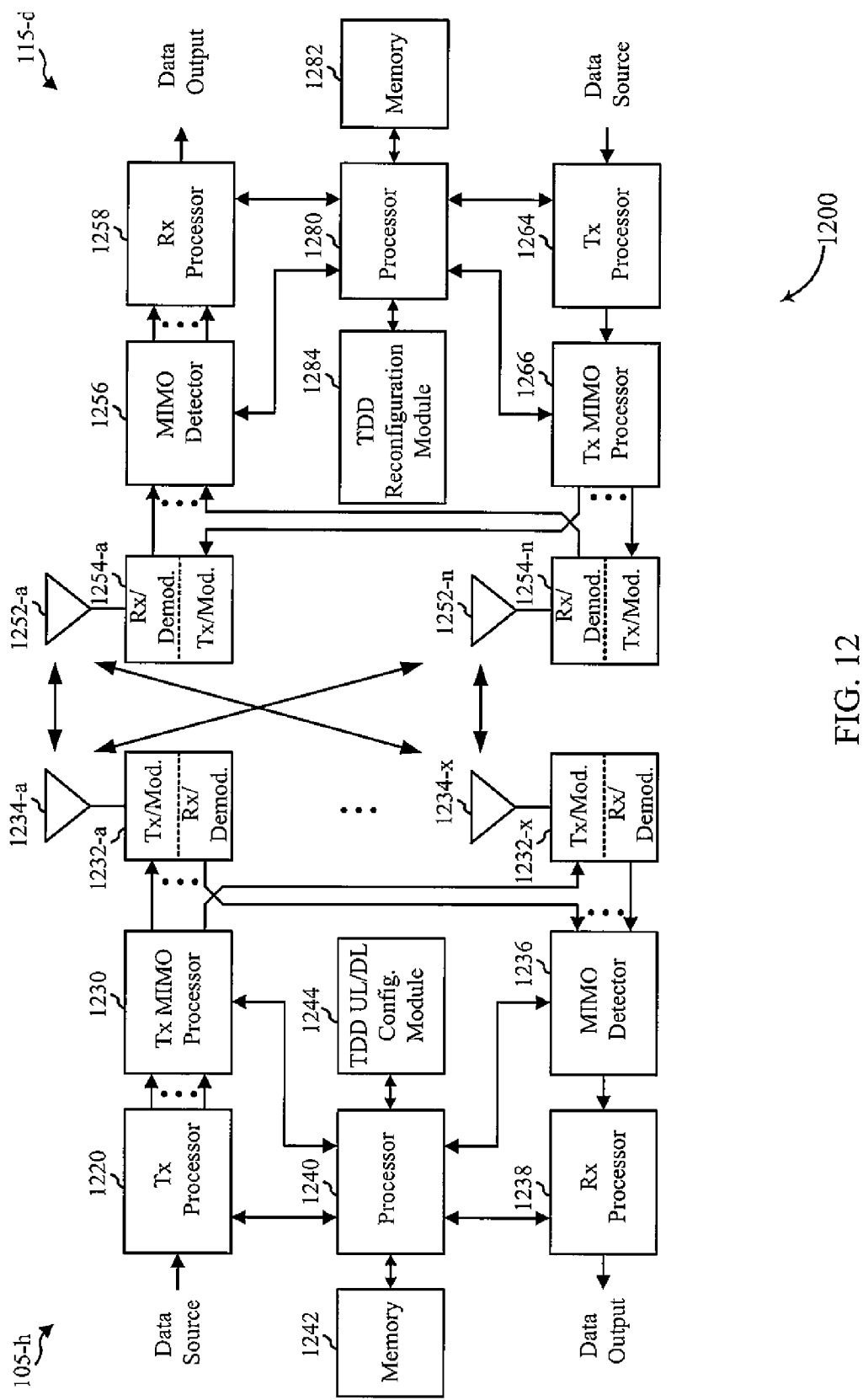
FIG. 12 is a block diagram of an example of a wireless communications system including an eNodeB and a UE in accordance with various examples.

FIG. 12 is a block diagram of a system 1200 including an eNodeB 105-h and a UE 115-d. This system 1200 may be an example of the wireless communications system 100 of FIG. 1, the wireless communications system 300 of FIG. 3, the wireless communications system 500 of FIG. 5, or the wireless communication system 1000 of FIG. 10. The eNodeB 105-h may be equipped with antennas 1234-a through 1234-x, and the UE 115-d may be equipped with UE antennas 1252-a through 1252-n. At the eNodeB 105-h, a transmit processor 1220 may receive data from a data source.

The transmit processor 1220 may process the data. The transmit processor 1220 may also generate reference symbols, and a cell-specific reference signal. A transmit (TX) MIMO processor 1230 may perform spatial processing (e.g., precoding) on data symbols, control symbols, and/or reference symbols, if applicable, and may provide output symbol streams to the eNodeB modulator/demodulators 1232-a through 1232-x. Each eNodeB modulator/demodulator 1232 may process a respective output symbol stream (e.g., for OFDM, etc.) to obtain an output sample stream. Each eNodeB modulator/demodulator 1232 may further process (e.g., convert to analog, amplify, filter, and upconvert) the output sample stream to obtain a downlink (DL) signal. In one example, DL signals from eNodeB modulator/demodulators 1232-a through 1232-x may be transmitted via the antennas 1234-a through 1234-x, respectively according to a particular TDD Uplink/Downlink configuration.

At the UE 115-d, the UE antennas 1252-a through 1252-n may receive the DL signals according to the particular TDD Uplink/Downlink configuration from the eNodeB 105-h and may provide the received signals to the UE modulator/ demodulators 1254-*a* through 1254-*n*, respectively. Each UE modulator/demodulator 1254 may condition (e.g., filter, amplify, downconvert, and digitize) a respective received signal to obtain input samples. Each UE modulator/demodulator 1254 may further process the input samples (e.g., for OFDM, etc.) to obtain received symbols. A MIMO detector 1256 may obtain received symbols from all the UE modulator/demodulators 1254-*a* through 1254-*n*, perform MIMO detection on the received symbols if applicable, and provide detected symbols. A receive processor 1258 may process (e.g., demodulate, deinterleave, and decode) the detected symbols, providing decoded data for the UE 115-*d* to a data output, and provide decoded control information to a processor 1280, or memory 1282. The processor 1280 may be coupled with a TDD reconfiguration module 1284 that may reconfigure the TDD UL-DL configuration of UE 115-*d*, such as described above. The processor 1280 may perform frame formatting according to a current TDD UL/DL configuration, and may thus flexibly configure the TDD UL/DL frame structure based on the current UL/DL configuration of the eNodeB 105-*h*.

On the uplink (UL), at the UE 115-*d*, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the UE modulator/demodulators 1254-*a* through 1254-*n* (e.g., for SC-FDMA, etc.), and be transmitted to the eNodeB 105-*h* in accordance with the transmission parameters received from the eNodeB 105-*h*. At the eNodeB 105-*h*, the UL signals from the UE 115-*d* may be received by the antennas 1234, processed by the eNodeB modulator/demodulators 1232, detected by a MIMO detector 1236 if applicable, and further processed by a receive processor 1238. The receive processor 1238 may provide decoded data to a data output and to the eNodeB processor 1240. A memory 1242 may be coupled with the eNodeB processor 1240. The eNodeB processor 1240 may perform frame formatting according to a current TDD UL/DL configuration. A TDD UL/DL configuration module 1244 may, in some examples, configure or reconfigure the eNodeB 105-*h*, or one or more carriers of the eNodeB 105-*h*, to operate according to different TDD UL/DL configurations, and transmit information related to the reconfigured UL-DL configurations to UE 115-*d*, such as described above. Similarly as discussed above, system 1200 may support operation on multiple component carriers, each of which include waveform signals of different frequencies that are transmitted between eNodeB 105-*h* and UE 115-*d*. Multiple component carriers may carry uplink and downlink transmissions between UE 115-*d* and eNodeB 105-*h*, and eNodeB 105-*h* may support operation on multiple component carriers that may each have different TDD configurations. In some examples, the TDD UL/DL configuration module 1244 may dynamically reconfigure the TDD UL/DL configuration of eNodeB 105-*h* carriers according to real-time or near real-time communications through the eNodeB 105-*h*. The components of the UE 115-*d* may, individually or collectively, be implemented with one or more Application Specific Integrated Circuits (ASICs) adapted to perform some or all of the applicable functions in hardware. Each of the noted modules may be a means for performing one or more functions related to operation of the system 1200. Similarly, the components of the eNodeB 105-*h* may, individually or collectively, be implemented with one or more Application Specific Integrated Circuits (ASICs) adapted to perform some or all of the applicable functions in hardware.

Each of the noted components may be a means for performing one or more functions related to operation of the system 1200.

Figure 13:
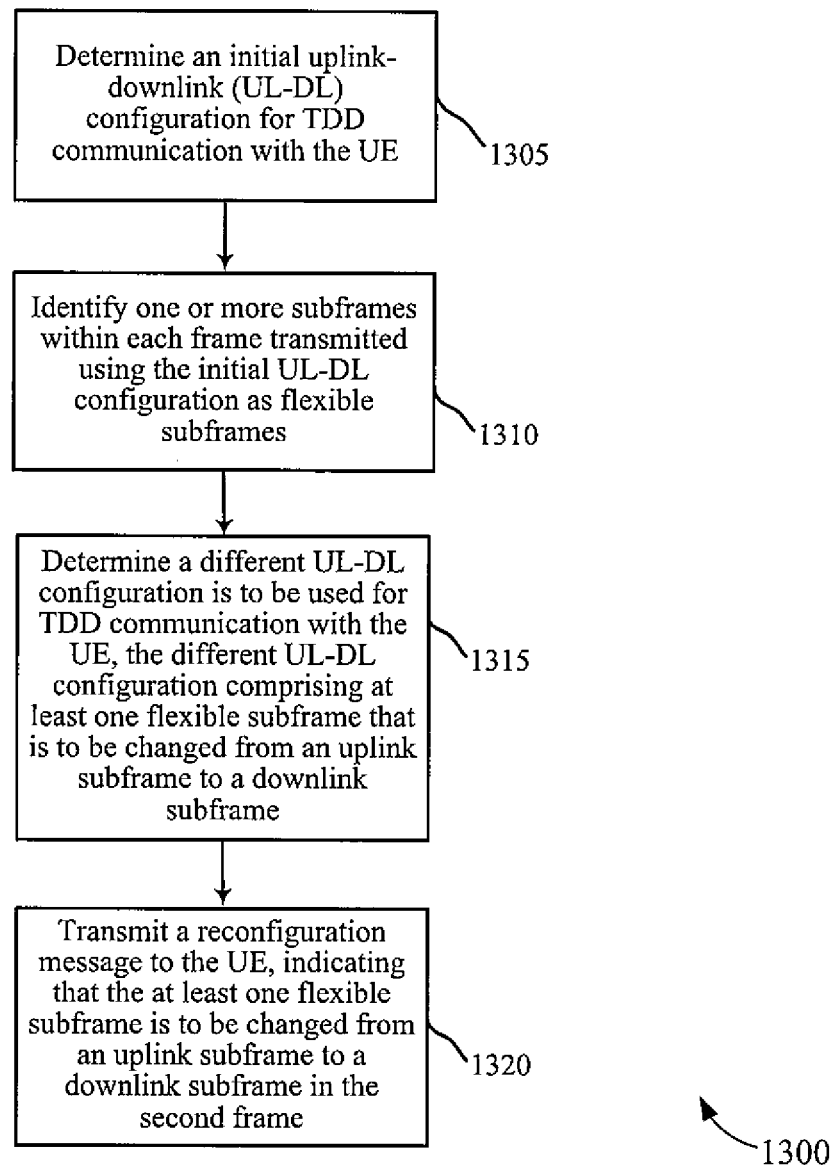
FIG. 13 is a flowchart of a method for dynamic reconfiguration of TDD UL-DL configuration in accordance with various examples.

FIG. 13 illustrates a method 1300 that may be carried out by an eNodeB in a wireless communications system according to various examples. The method 1300 may, for example, be performed by an eNodeB of FIG. 1, 3, 5, 10, or 12, or using any combination of the devices described for these figures. Initially, at block 1305, the eNodeB determines an initial uplink-downlink (UL-DL) configuration for TDD communication with the UE. For example, the UE may be a non-legacy UE that may operate according to eIMTA to be reconfigured to change TDD UL-DL configurations. The initial UL-DL configuration may be provided, for example, through system information blocks, for example. The TDD UL-DL configuration selection module 520 may be the means for determining an initial UL-DL configuration for TDD communication with the UE.

At block 1310, the eNodeB identifies one or more subframes within each frame transmitted using the initial UL-DL configuration as flexible subframes. Such an identification may be transmitted using, for example, a bitmap or a second semi-static TDD UL-DL configuration that indicates the minimum uplink subframes that cannot be reconfigured from uplink to downlink subframes, with the flexible subframes determined based on the minimum uplink subframes and the uplink subframes associated with the initial UL-DL configuration. The TDD UL-DL configuration selection module 520 may be the means for identifying one or more subframes within each frame transmitted using the initial UL-DL configuration as flexible subframes.

At block 1315, the eNodeB determines a different UL-DL configuration is to be used for TDD communication with the UE, the different UL-DL configuration comprising at least one flexible subframe that is to be changed from an uplink subframe to a downlink subframe. The UL-DL reconfiguration determination module 530 may be the means for determining a different UL-DL configuration is to be used for TDD communication with the UE.

At block 1320, the eNodeB transmits a reconfiguration message to the UE, indicating that the at least one flexible subframe is to be changed from an uplink subframe to a downlink subframe in the second frame. The reconfiguration message may be, for example, transmitted through physical layer (PHY) signaling to the UE, or may include a pseudo-uplink grant for the at least one flexible subframe that is to be changed from an uplink subframe to a downlink subframe in the second frame. In some examples, such as described above, HARQ acknowledgment timing is unchanged between the initial UL-DL configuration and the HARQ timing for the reconfigured UL-DL configuration and may be based on the configuration of the maximum number of uplink subframes for uplink HARQ information and based on the minimum number of uplink subframes for downlink HARQ information. The UL-DL reconfiguration transmission module 535 may be the means for transmitting a reconfiguration message to the UE.

Figure 14:
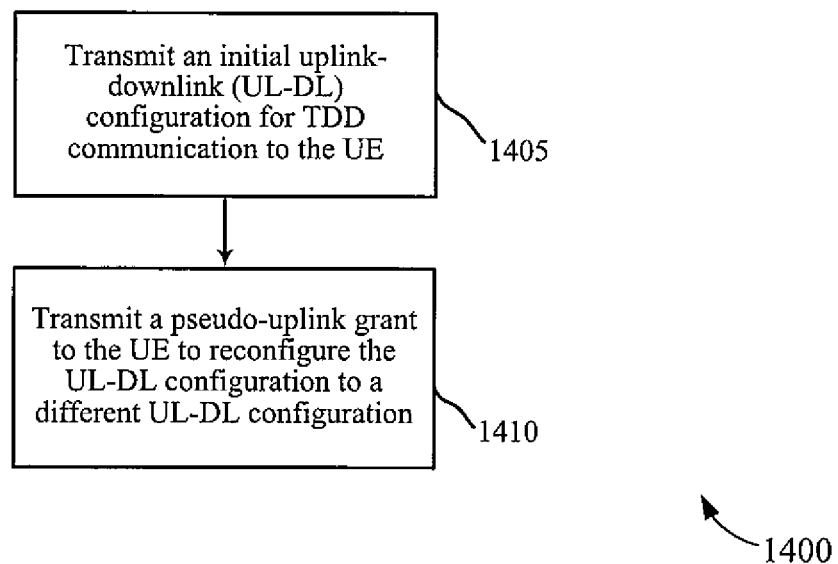
FIG. 14 is a flowchart of another method for dynamic reconfiguration of TDD UL-DL configuration in accordance with various examples.

FIG. 14 illustrates another method 1400 that may be carried out by an eNodeB in a wireless communications system according to various examples. The method 1400 may, for example, be performed by an eNodeB of FIG. 1, 3, 5, 10, or 12, or using any combination of the devices described for these figures.

Initially, at block 1405, the eNodeB transmits an initial uplink-downlink (UL-DL) configuration for TDD communication to the UE. The TDD UL-DL configuration transmission module 525 may be the means for transmitting an initial uplink-downlink (UL-DL) configuration for TDD communication to the UE.

At block 1410, the eNodeB transmits a pseudo-uplink grant to the UE to reconfigure the UL-DL configuration to a different UL-DL configuration. In some examples, the pseudo-uplink grant comprises an invalid resource block allocation for at least one subframe of a TDD frame. Such an invalid resource block allocation may include a resource indication value (RIV) that exceeds a maximum value of an RIV for an uplink grant. In some examples, similarly as described above, the pseudo-uplink grant may include a first pseudo-uplink grant for a first of the flexible subframes of a TDD frame, and the eNodeB may transmit a second pseudo-uplink grant for a second of the flexible subframes of the TDD frame. In such a manner, subframes in a TDD communication may be reconfigured dynamically, allowing for increased flexibility in uplink and downlink bandwidth with the particular UE. The UL-DL reconfiguration transmission module 535 may be the means for transmitting a pseudo-uplink grant to the UE to reconfigure the UL-DL configuration to a different UL-DL configuration.

Figure 15:
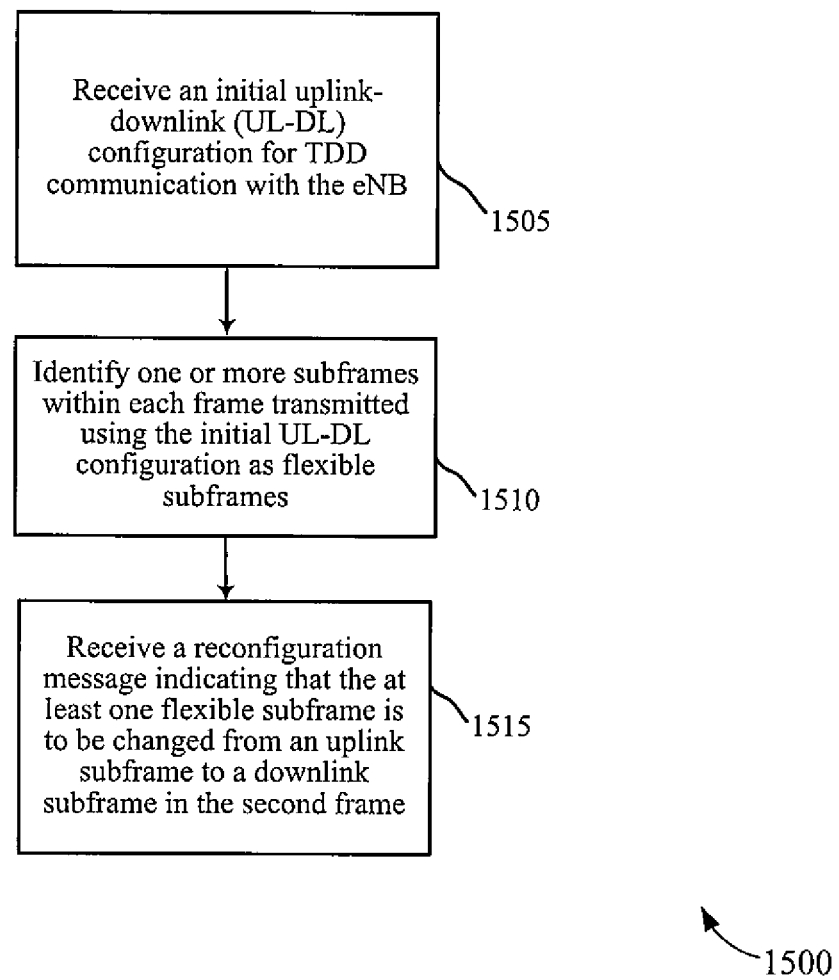
FIG. 15 is a flowchart of another method for dynamic reconfiguration of TDD UL-DL configuration in accordance with various examples.

FIG. 15 illustrates a method 1500 that may be carried out by a user equipment in a wireless communications system according to various examples. The method 1500 may, for example, be performed by a user equipment of FIG. 1, 3, 5, 10, or 12, or using any combination of the devices described for these figures.

Initially, at block 1505, the user equipment receives an initial uplink-downlink (UL-DL) configuration for TDD communication with the eNodeB. Such an initial UL-DL configuration may include, such as described above, a maximum number of uplink subframes within each frame and/or a minimum number of uplink subframes within each frame. In some examples, the UE may determine uplink HARQ acknowledgment position within the subframes based on the configuration of the maximum number of uplink subframes, with such HARQ acknowledgment timing being unchanged between initial and reconfigured UL-DL configurations. The maximum number of uplink subframes may be received in a SIB, and the minimum number of uplink subframes may be received in a bitmap identifying the minimum number of uplink subframes or determined from a second semi-static TDD UL-DL configuration through, for example, RRC signaling. The TDD UL-DL configuration determination module 1105 of FIG. 11 may be the means for receiving an initial uplink-downlink (UL-DL) configuration for TDD communication with an eNodeB.

At block 1510, the UE identifies one or more subframes within each frame transmitted using the initial UL-DL configuration as flexible subframes. The flexible subframes may be identified, for example, based on the minimum uplink subframes and the uplink subframes associated with the initial UL-DL configuration. The TDD UL-DL configuration determination module 1105 of FIG. 11 may be the means for identifying one or more subframes within each frame transmitted using the initial UL-DL configuration as flexible subframes.

Finally, at block 1515, the UE receives a reconfiguration message indicating that the at least one flexible subframe is to be changed from an uplink subframe to a downlink subframe in the second frame. Such a reconfiguration message may be transmitted through physical layer (PHY) signaling at the UE, and/or may be received through one or more pseudo-uplink grants having an invalid resource block allocation for the associated flexible subframe(s). In some examples, the invalid resource block allocation may be a RIV that exceeds a maximum value of a RIV for an uplink grant. In such a manner, subframes in a TDD communication may be reconfigured dynamically, allowing for increased flexibility in uplink and downlink bandwidth for the UE. The UL-DL reconfiguration determination module 1110 of FIG. 11 may be the means for receiving a reconfiguration message indicating that the at least one flexible subframe is to be changed from an uplink subframe to a downlink subframe.

Figure 16:
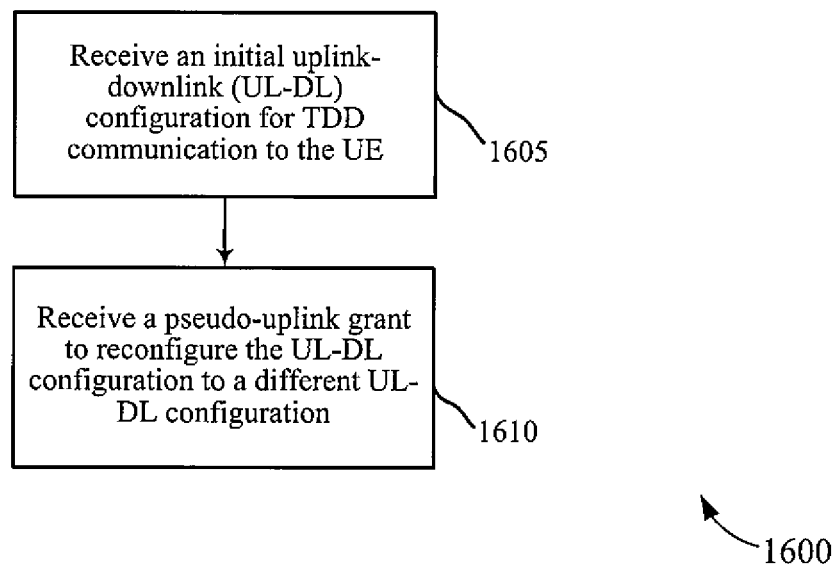
FIG. 16 is a flowchart of another method for dynamic reconfiguration of TDD UL-DL configuration in accordance with various examples.

FIG. 16 illustrates another method 1600 that may be carried out by a UE in a wireless communications system according to various examples. The method 1600 may, for example, be performed by a UE of FIG. 1, 3, 5, 10, or 12, or using any combination of the devices described for these figures.

Initially, at block 1605, the UE receives an initial uplink-downlink (UL-DL) configuration for TDD communication to the UE. The TDD UL-DL configuration determination module 1105 of FIG. 11 may be the means for receiving an initial uplink-downlink (UL-DL) configuration for TDD communication with the eNodeB.

At block 1610, the UE receives a pseudo-uplink grant to the UE to reconfigure the UL-DL configuration to a different UL-DL configuration. In some examples, the pseudo-uplink grant comprises an invalid resource block allocation for at least one subframe of a TDD frame. Such an invalid resource block allocation may include a resource indication value (RIV) that exceeds a maximum value of an RIV for an uplink grant. In some examples, similarly as described above, the pseudo-uplink grant may include a first pseudo-uplink grant for a first of the flexible subframes of a TDD frame, and the eNodeB may transmit a second pseudo-uplink grant for a second of the flexible subframes of the TDD frame. In such a manner, subframes in a TDD communication may be reconfigured dynamically, allowing for increased flexibility in uplink and downlink bandwidth with the particular UE. The UL-DL reconfiguration determination module 1110 of FIG. 11 may be the means for receiving a pseudo-uplink grant to reconfigure the UL-DL configuration to a different UL-DL configuration.

The detailed description set forth above in connection with the appended drawings describes examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication performed by a user equipment (UE) in time-division duplex (TDD) communication with an eNodeB, comprising:
   receiving an initial uplink-downlink (UL-DL) configuration for TDD communication with the eNodeB;
   identifying one or more subframes within the initial UL-DL configuration as flexible subframes;
   receiving an uplink grant comprising an indication that at least one of the one or more flexible subframes of a given frame is to be changed from an uplink subframe to a downlink subframe, wherein the indication comprises an invalid resource block allocation for the at least one of the one or more flexible subframes of the given frame; and
   receiving downlink communications during one or more of the flexible subframes changed from an uplink subframe to a downlink subframe.

2. The method of claim 1, wherein receiving the uplink grant comprises receiving physical layer signaling at the UE.

3. The method of claim 1, wherein the invalid resource block allocation comprises a resource indication value (RIV) that exceeds a maximum value of an RIV for the uplink grant.

4. The method of claim 1, further comprising:
   receiving a second uplink grant comprising an indication that a second of the one or more flexible subframes of the given frame is to be changed from an uplink subframe to a downlink subframe.

5. The method of claim 1, wherein HARQ acknowledgment timing is unchanged between the initial UL-DL configuration and a reconfigured UL-DL configuration.

6. The method of claim 1, wherein the initial UL-DL configuration comprises a maximum number of uplink subframes within each frame.

7. The method of claim 6, further comprising:
   determining an uplink HARQ acknowledgment position within a set of subframes based on an UL-DL configuration of the maximum number of uplink subframes.

8. The method of claim 6, wherein the maximum number of uplink subframes is received in a system information block (SIB).

9. The method of claim 6, wherein the initial UL-DL configuration further comprises a minimum number of uplink subframes within each frame.

10. The method of claim 9, further comprising:
    determining a downlink HARQ acknowledgment position within a set of subframes based on an UL-DL configuration of the minimum number of uplink subframes.

11. The method of claim 9, wherein the minimum number of uplink subframes are received using a bitmap identifying the minimum number of uplink subframes.

12. The method of claim 9, wherein the minimum number of uplink subframes are transmitted using a configuration index that identifies minimum uplink subframes in a semi-static set of different minimum uplink subframes.

13. The method of claim 1, further comprising:
    receiving the initial UL-DL configuration from the eNodeB.

14. The method of claim 13, wherein the initial UL-DL configuration is received in one system information block (SIB).

15. The method of claim 1, wherein the flexible subframes are initially configured as uplink subframes.

16. A wireless communication user equipment (UE) apparatus configured to operate using one of multiple time-division duplex (TDD) uplink-downlink (UL-DL) configurations, comprising:
  at least one processor configured to:
  receive an initial uplink-downlink (UL-DL) configuration for TDD communication with an eNodeB;
  identify one or more subframes within the initial UL-DL configuration as flexible subframes;
  receive an uplink grant comprising an indication that at least one of the one or more flexible subframes of a given frame is to be changed from an uplink subframe to a downlink subframe, wherein the indication comprises an invalid resource block allocation for the at least one of the one or more flexible subframes of the given frame; and
  receive downlink communications during one or more of the flexible subframes changed from an uplink subframe to a downlink subframe; and
  a memory coupled with the at least one processor.

17. The apparatus of claim 16, wherein the at least one processor is configured to receive the uplink grant via physical layer signaling received at the UE.

18. The apparatus of claim 16, wherein the invalid resource block allocation comprises a resource indication value (RIV) that exceeds a maximum value of an RIV for the uplink grant.

19. The apparatus of claim 16, wherein the initial UL-DL configuration is received in a system information block (SIB).

20. A wireless communication user equipment (UE) apparatus configured to operate using one of multiple time-division duplex (TDD) uplink-downlink (UL-DL) configurations, comprising:
  means for receiving an initial uplink-downlink (UL-DL) configuration for TDD communication with an eNodeB;
  means for identifying one or more subframes within the initial UL-DL configuration as flexible subframes;
  means for receiving an uplink grant comprising an indication that at least one of the one or more flexible subframes of a given frame is to be changed from an uplink subframe to a downlink subframe, wherein the indication comprises an invalid resource block allocation for the at least one of the one or more flexible subframes of the given frame; and
  means for receiving downlink communications during one or more of the flexible subframes changed from an uplink subframe to a downlink subframe.

21. The apparatus of claim 20, wherein the means for receiving the uplink grant comprises means for receiving physical layer signaling.

22. A method of wireless communication performed by a user equipment (UE) in time-division duplex (TDD) communication with an eNodeB, comprising:
  receiving an initial uplink-downlink (UL-DL) configuration for TDD communication with the eNodeB;
  receiving an uplink grant comprising an indication to reconfigure the initial UL-DL configuration to a different UL-DL configuration for a given frame, wherein the indication comprises an invalid resource block allocation for at least one flexible subframe of the initial UL-DL configuration for the given frame; and
  communicating with the eNodeB according to the different UL-DL configuration for the given frame.

23. The method of claim 22, wherein the invalid resource block allocation comprises a resource indication value (RIV) that exceeds a maximum value of an RIV for the uplink grant.

24. The method of claim 22, wherein the uplink grant comprises an indication to reconfigure the initial UL-DL configuration for a first flexible subframe of the given frame, and wherein the method further comprises receiving a second uplink grant comprising an indication to reconfigure the initial UL-DL configuration for a second flexible subframe of the given frame.

25. The method of claim 1, further comprising:
  detecting whether a downlink grant is present in one or more of the flexible subframes changed from an uplink subframe to a downlink subframe.

26. The method of claim 1, further comprising:
  suppressing detection of downlink grants during flexible subframes that are not changed from an uplink subframe to a downlink subframe.

* * * * *